(12) United States Patent
Kim et al.

(10) Patent No.: US 7,474,363 B2
(45) Date of Patent: Jan. 6, 2009

(54) LIQUID CRYSTAL DISPLAY AND PANEL THEREFOR

(75) Inventors: Hyun-Wuk Kim, Gyeonggi-do (KR); Jae-Jin Lyu, Gyeonggi-do (KR); Yoon-Sung Um, Gyeonggi-do (KR); Chang-Hun Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 644 days.

(21) Appl. No.: 11/253,529

(22) Filed: Oct. 18, 2005

(65) Prior Publication Data

US 2006/0087610 A1 Apr. 27, 2006

(30) Foreign Application Priority Data

Oct. 26, 2004 (KR) .................. 10-2004-0085687

(51) Int. Cl.
*G02F 1/16* (2006.01)

(52) U.S. Cl. ......................................... 349/43; 349/38
(58) Field of Classification Search .................. 349/43, 349/38

See application file for complete search history.

(56) References Cited

U.S. PATENT DOCUMENTS 7,355,666 B2 * 4/2008 Song et al. .................. 349/144

* cited by examiner

*Primary Examiner*—David Nelms
*Assistant Examiner*—Phu Vu
(74) *Attorney, Agent, or Firm*—MacPherson Kwok Chen & Heid LLP

(57) ABSTRACT

A liquid crystal display according to an embodiment of the present invention includes: a gate line; a data line intersecting the gate line; a thin film transistor coupled to the gate line and the data line; and a pixel including a first subpixel coupled to the thin film transistor and a second subpixel capacitively coupled to the first subpixel, wherein the first subpixel and the second subpixel have different cell gaps.

18 Claims, 29 Drawing Sheets

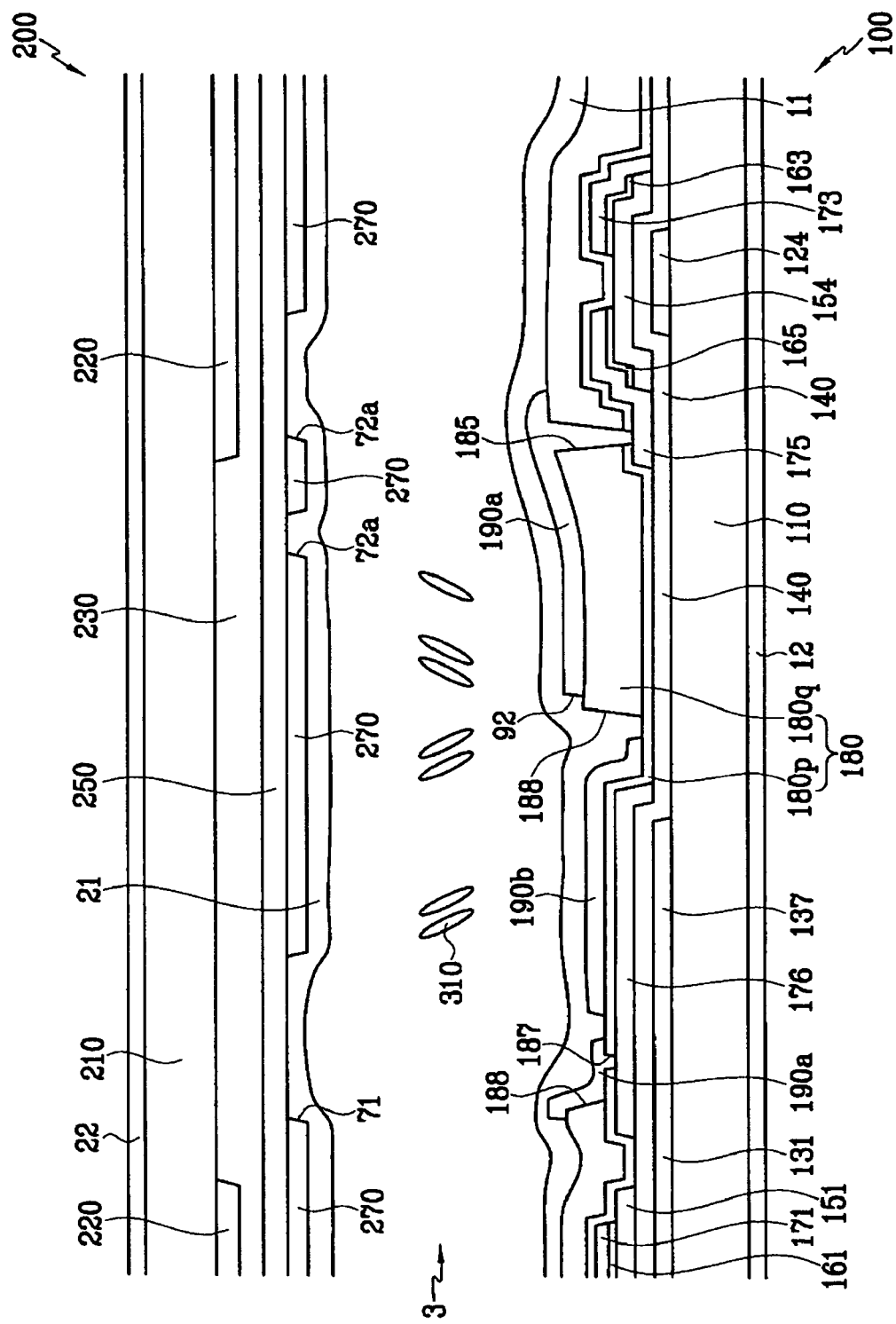

LIQUID CRYSTAL DISPLAY AND PANEL THEREFOR

BACKGROUND OF THE INVENTION (a) Field of the Invention

The present invention relates to a liquid crystal display and a panel therefor.

(b) Description of the Related Art

A liquid crystal display (LCD) is one of the most widely used flat panel displays. An LCD includes two panels provided with field-generating electrodes, such as pixel electrodes and a common electrode, and a liquid crystal (LC) layer interposed therebetween. The LCD displays images by applying voltages to the field-generating electrodes to generate an electric field in the LC layer, which determines orientations of LC molecules in the LC layer to adjust the polarization of incident light.

Among the various types of LCDs, a vertical alignment (VA) mode LCD, which aligns LC molecules such that the long axes of the LC molecules are perpendicular to the panels in absence of electric field, is of particular interest because of its high contrast ratio and wide reference viewing angle.

The wide viewing angle of the VA mode LCD can be achieved using cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has poor lateral visibility as compared with front visibility.

SUMMARY OF THE INVENTION

A liquid crystal display according to an embodiment of the present invention includes: a gate line; a data line intersecting the gate line; a thin film transistor coupled to the gate line and the data line; and a pixel including a first subpixel coupled to the thin film transistor and a second subpixel capacitively coupled to the first subpixel, wherein the first subpixel and the second subpixel have different cell gaps.

The cell gap of the first subpixel may be smaller than the cell gap of the second subpixel.

A liquid crystal display according to an embodiment of the present invention includes: a gate line; a data line intersecting the gate line; a thin film transistor coupled to the gate line and the data line; and a pixel including a first subpixel coupled to the thin film transistor and a second subpixel capacitively coupled to the first subpixel, wherein the first subpixel and the second subpixel give different retardation.

The retardation given by the first subpixel may be smaller than the retardation given by the second subpixel.

A thin film transistor array panel according to an embodiment of the present invention includes: a gate line; a data line intersecting the gate line; a thin film transistor coupled to the gate line and the data line; and a pixel electrode including a first subpixel electrode coupled to the thin film transistor and a second subpixel electrode spaced apart from the first subpixel electrode and having an electrical coupling with the first subpixel electrode, wherein the first subpixel electrode is disposed at a cross-sectional position higher than the second subpixel electrode.

The thin film transistor array panel may further include an insulating layer disposed on the gate line, the data line, and the thin film transistor and including a first portion disposed under the first subpixel electrode and a second portion disposed under the second subpixel electrode and thinner than the first portion.

The insulating layer may include a lower film and an upper film comprising a different material from the lower film and disposed on the lower film.

The lower film may include silicon nitride or silicon oxide, and the upper film comprises organic insulator.

The first subpixel electrode may be disposed on the upper film and the second subpixel electrode is disposed on the lower film.

The upper film may have an opening exposing the lower film and the second subpixel electrode is disposed in the opening.

The second subpixel electrode may be capacitively coupled to the first subpixel electrode.

The thin film transistor array panel may further include a coupling electrode coupled to the first subpixel electrode and overlapping the second subpixel electrode.

The coupling electrode may be coupled to the thin film transistor.

The thin film transistor array panel may further include a storage electrode overlapping the pixel electrode, the coupling electrode, and a terminal of the thin film transistor.

A liquid crystal display according to an embodiment of the present invention includes: a gate line; a data line intersecting the gate line; a thin film transistor coupled to the gate line and the data line; a pixel electrode including a first subpixel electrode coupled to the thin film transistor and a second subpixel electrode spaced apart from the first subpixel electrode and capacitively coupled with the first subpixel electrode; a common electrode disposed opposite the pixel electrode; and a liquid crystal layer disposed between the pixel electrode and the common electrode and including a first region disposed on the first subpixel electrode and a second region disposed on the second subpixel electrode, wherein the thickness of the first and the second regions of the liquid crystal layer is different.

The first region of the liquid crystal layer may be thinner than the second region of the liquid crystal layer.

The liquid crystal display may further include a passivation layer disposed on the gate lines, the data line, and the thin film transistor and including a first portion disposed under the first subpixel electrode and a second portion disposed under the second subpixel electrode and thicker than the first portion.

The passivation layer may include a first thin film and a second thin film disposed on the first thin film and thinner than disposed on the gate lines, the data line, and the pixel electrode and including a first portion disposed under the first subpixel electrode and a second portion disposed under the second subpixel electrode and thicker than the first portion.

BRIEF DESCRIPTION OF THE DRAWINGS

The present invention will become more apparent by describing embodiments thereof in detail with reference to the accompanying drawings in which:

FIG. 11 is a sectional view of the LCD shown in FIG. 10 taken along line X-X';

DETAILED DESCRIPTION OF EMBODIMENTS

Figure 1:
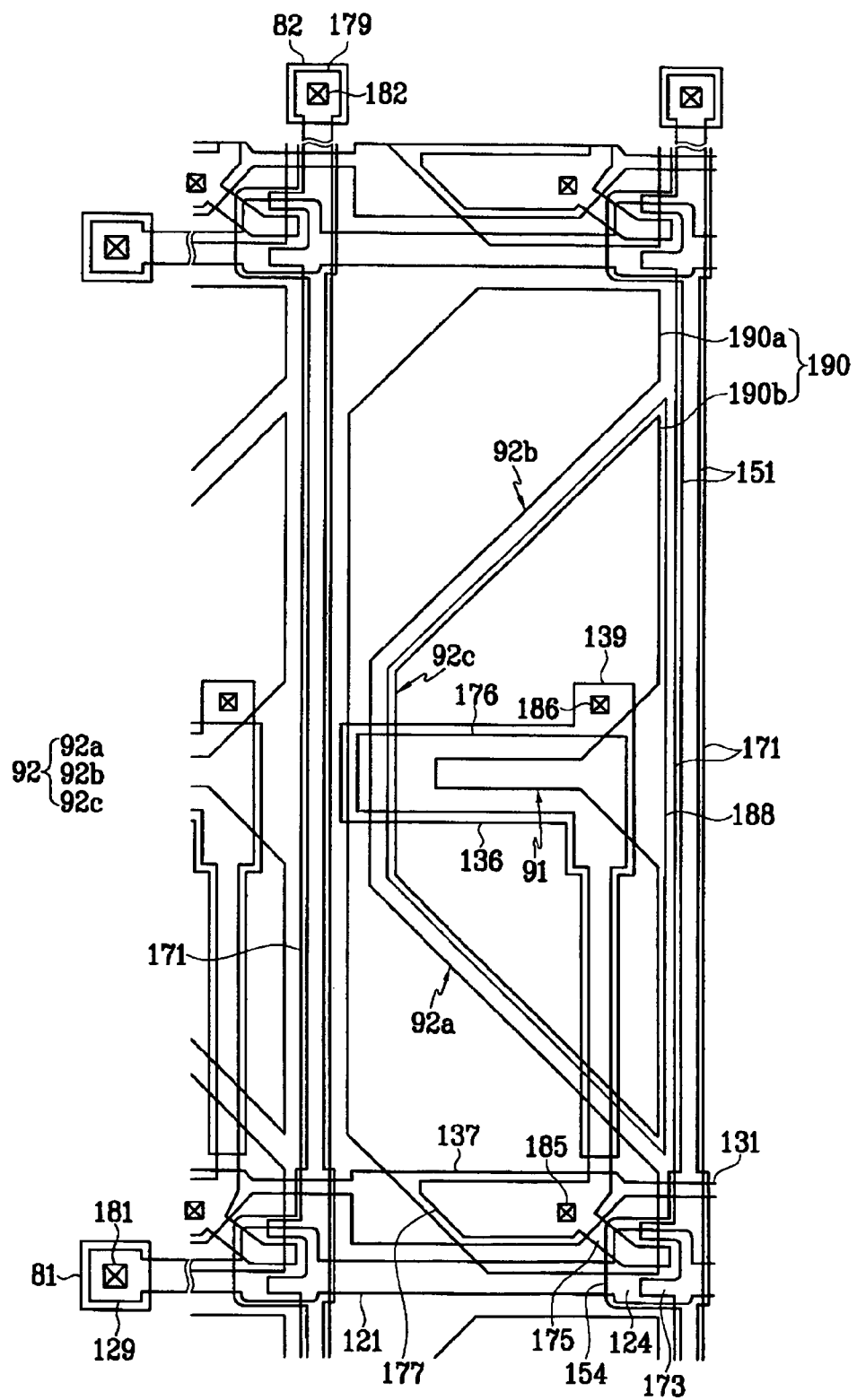
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thicknesses of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1-5.

Figure 2:
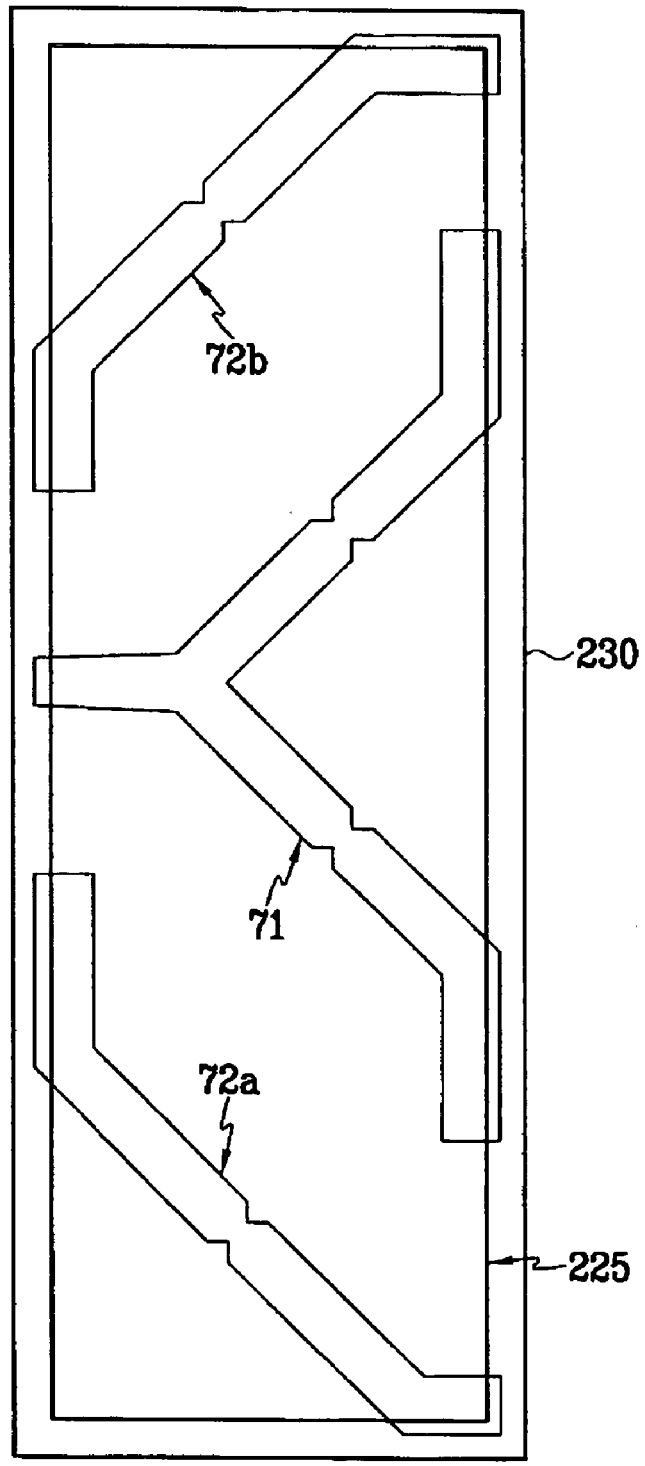
FIG. 2 is a layout view of a common electrode panel of an LCD according to an embodiment of the present invention.
Figure 3:
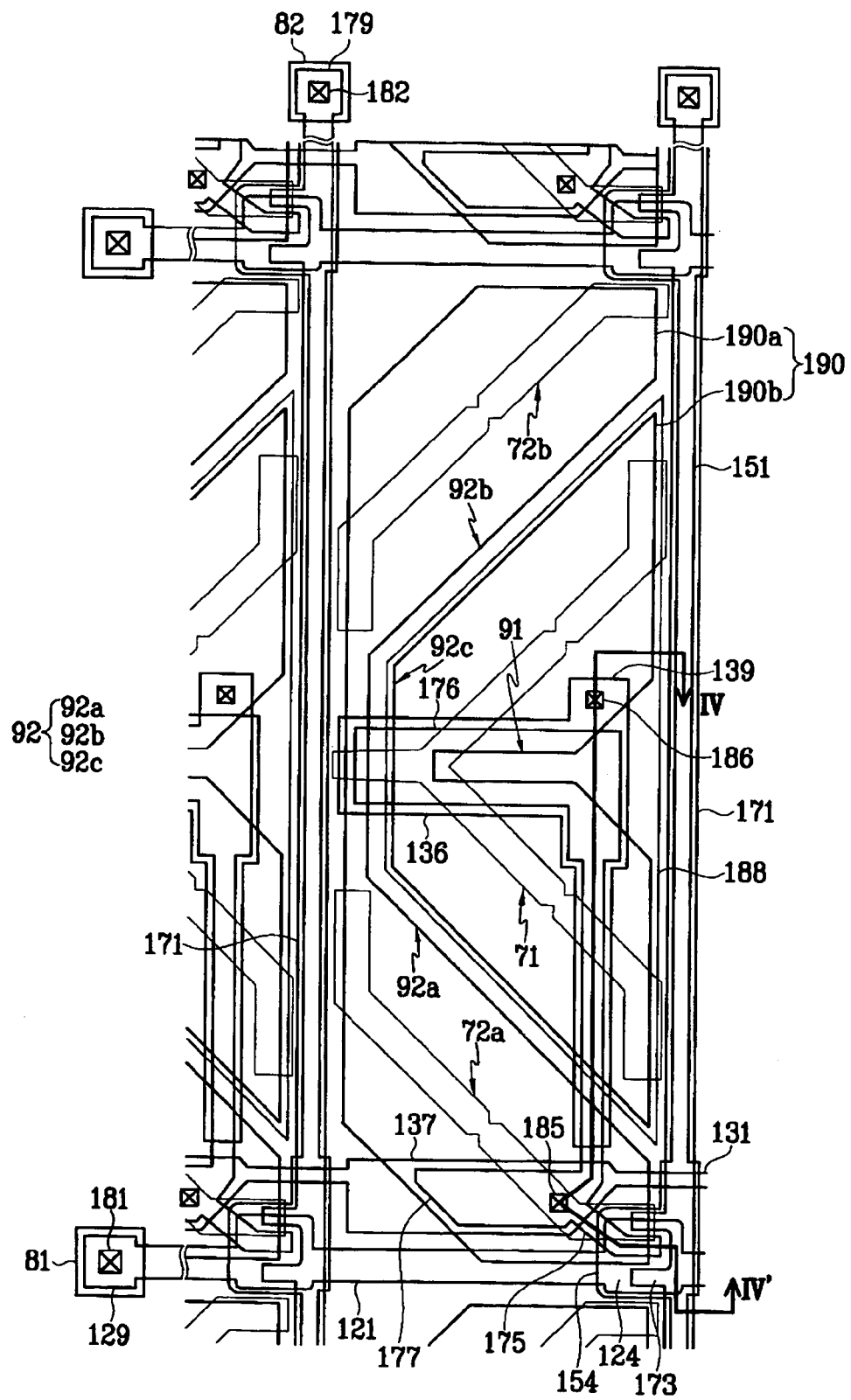
FIG. 3 is a layout view of an LCD including the TFT array panel shown in FIG. 1 and the common electrode panel shown in FIG. 2.
Figure 4:
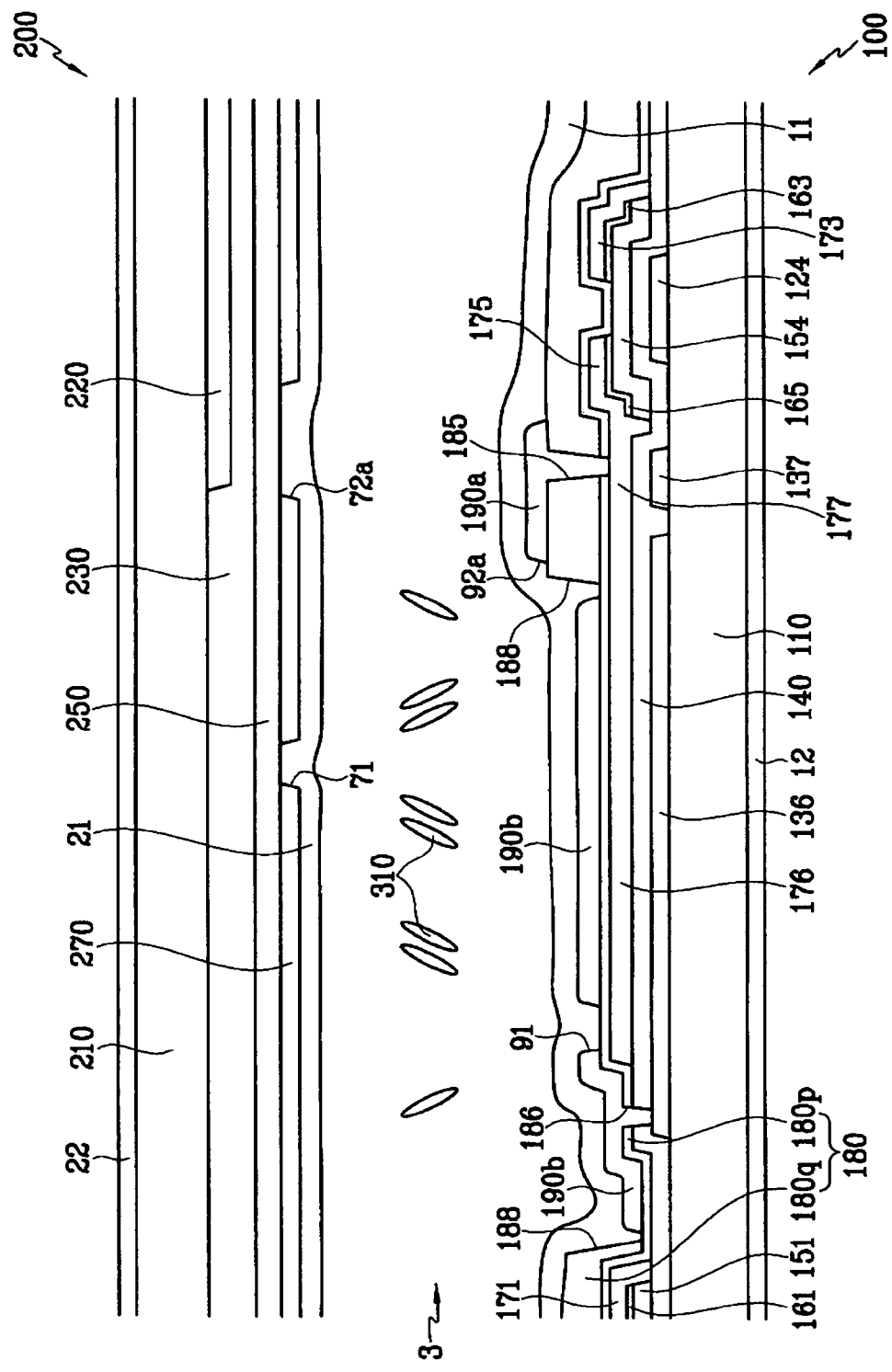
FIG. 4 is a sectional view of the LCD shown in FIG. 3 taken along line IV-IV'.
Figure 5:
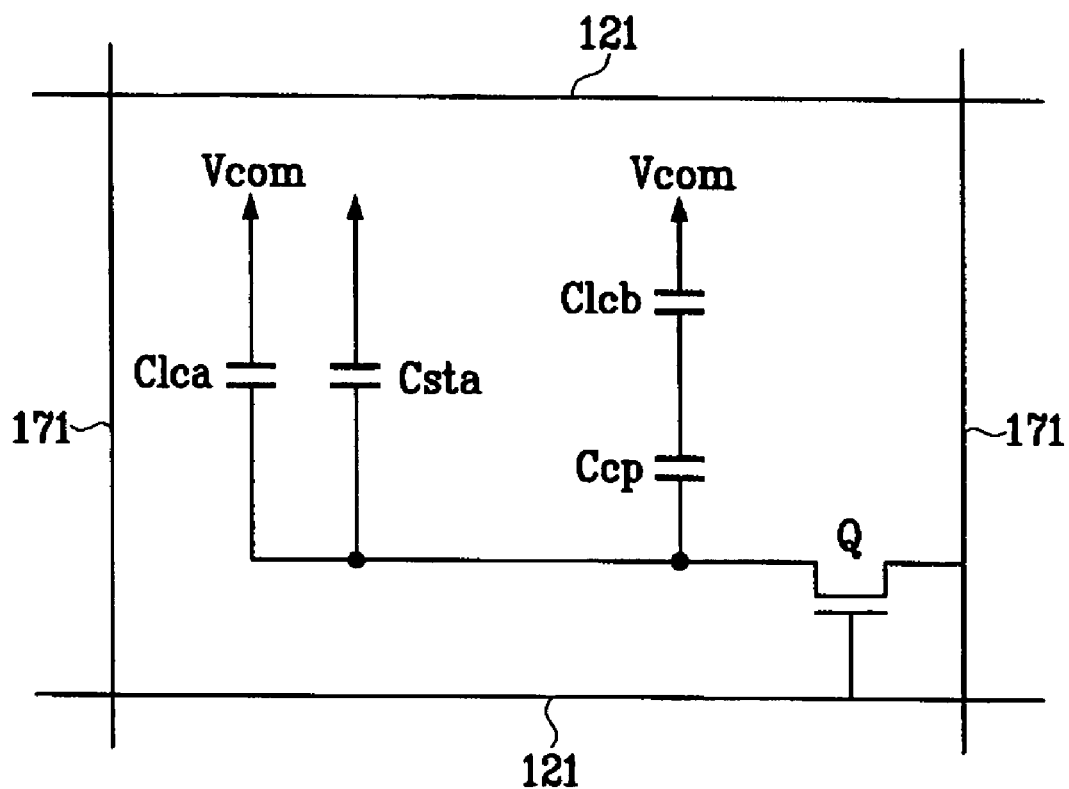
FIG. 5 is an equivalent circuit diagram of the LCD shown in FIGS. 1-4.

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, FIG. 4 is a sectional view of the LCD shown in FIG. 3 taken along line IV-IV', and FIG. 5 is an equivalent circuit diagram of the LCD shown in FIGS. 1-4.

Referring to FIGS. 1-4, an LCD according to an embodiment of the present invention includes a TFT array panel 100, a common electrode panel 200, and a LC layer 3 interposed between the panels 100 and 200.

The TFT array panel 100 is now described in detail with reference FIGS. 1, 3 and 4.

A plurality of gate conductors including a plurality of gate lines 121, a plurality of storage electrode lines 131, and a plurality of capacitive electrodes 136 are formed on an insulating substrate 110 such as transparent glass or plastic.

The gate lines 121 transmit gate signals and extend substantially in a transverse direction. Each gate line 121 includes a plurality of gate electrodes 124 projecting upward and downward (as viewed from the perspective shown in FIG. 1) and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrode lines 131 are supplied with a predetermined voltage and extend substantially parallel to the gate lines 121. Each of the storage electrode lines 131 is disposed between two adjacent gate lines 121 and is positioned to be closer to a lower one of the two adjacent gate lines 121. Each of the storage electrode lines 131 includes a plurality of storage electrodes 137 expanding upward and downward.

Each of the capacitive electrodes 136, which are separated from the storage electrode lines 131, includes a wide transverse portion including a projection 139 protruding upward and a narrow longitudinal portion connected thereto. The transverse portion has a rectangular shape elongated substantially parallel to the gate lines 121 and almost equidistant from two adjacent gate lines 121. The longitudinal portion extends from a right end of the transverse portion toward a storage electrode line 131 (as viewed from the perspective shown in FIG. 1).

The gate conductors 121, 131 and 136 preferably comprise an Al containing metal, such as Al or Al alloy, an Ag containing metal, such as Ag or Ag alloy, a Cu containing metal, such as Cu or Cu alloy, a Mo containing metal, such as Mo or Mo alloy, Cr, Ta, or Ti. However, gate conductors 121, 131 and 136 may have a multi-layered structure including two conductive films (not shown) having different physical characteristics. One of the two films preferably comprises a low resistivity metal including an Al containing metal, an Ag containing metal, or a Cu containing metal for reducing signal delay or voltage drop. The other film preferably comprises a material, such as a Mo containing metal, Cr, Ta, or Ti, which has good physical, chemical, and electrical contact characteristics with other materials, such as indium tin oxide (ITO) or indium zinc oxide (IZO). Good examples of the combination of the two films are a lower Cr film and an upper Al (alloy) film, or a lower Al (alloy) film and an upper Mo (alloy) film.

However, the gate conductors 121, 131 and 136 may comprise various metals or conductors.

The lateral sides of the gate conductors 121, 131 and 136 are inclined relative to a surface of the substrate 110, and the inclination angle thereof ranges from about 30 to about 80 degrees.

A gate insulating layer 140 preferably comprising silicon nitride ($SiN_x$) or silicon oxide ($SiO_x$) is formed on the gate conductors 121, 131 and 136.

A plurality of semiconductor stripes 151 preferably comprising hydrogenated amorphous silicon (abbreviated to "a-Si") or polysilicon are formed on the gate insulating layer 140. Each semiconductor stripe 151 extends substantially in the longitudinal direction and widens near the gate lines 121 and the storage electrode lines 131 such that the semiconductor stripes 151 cover large areas of the gate lines 121 and the storage electrode lines 131. Each semiconductor stripe 151 includes a plurality of projections 154 branching out toward the gate electrodes 124.

A plurality of ohmic contact stripes and islands 161 and 165 are formed on the semiconductor stripes 151. The ohmic contact stripes and islands 161 and 165 preferably comprise n+ hydrogenated a-Si heavily doped with an n type impurity, such as phosphorous. Alternatively, the ohmic contact stripes and islands 161 and 165 may comprise silicide. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range of about 30 to about 80 degrees.

A plurality of data conductors including a plurality of data lines 171 and a plurality of drain electrodes 175 are formed on the ohmic contacts 161 and 165 and the gate insulating layer 140.

The data lines 171 transmit data signals and extend substantially in the longitudinal direction to intersect the gate lines 121 and the storage electrode lines 131. Each data line 171 includes a plurality of source electrodes 173 projecting toward the gate electrodes 124 and an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

Each of the drain electrodes 175 is separated from the data lines 171 and includes a narrow end portion disposed opposite the source electrodes 173 with respect to the gate electrodes 124. The end portion is partly surrounded by a curved source electrode 173.

Each drain electrode 175 further includes an expansion 177 and a coupling electrode 176 connected thereto.

The expansion 177 overlaps a storage electrode 137 and has a roughly trapezoidal shape elongated parallel to the gate lines 121.

The coupling electrode 176 overlaps a capacitive electrode 136 and has nearly the same shape as the capacitive electrode 136. In detail, the coupling electrode 176 has a wide transverse portion and a longitudinal portion connected to the transverse portion and the expansion 177. However, the coupling electrode 176 does not overlap the projection 139 of the capacitive electrode 136.

A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data conductors 171 and 175 preferably comprise a refractory metal such as Cr, Mo, Ta, Ti, or alloys thereof. However, data conductors 171 and 175 may have a multilayered structure comprising a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171 and 175 may comprise various metals or conductors.

The data conductors 171 and 175 have inclined edge profiles, and the inclination angles thereof range from about 30 to about 80 degrees.

The ohmic contacts 161 and 165 are interposed only between the underlying semiconductor stripes 151 and the overlying data conductors 171 and 175 thereon and reduce the contact resistance therebetween. Although the semiconductor stripes 151 are narrower than the data lines 171 in most locations, the width of the semiconductor stripes 151 becomes large near the gate lines 121 as described above, to smooth the profile of the surface, thereby preventing the disconnection of the data lines 171. The semiconductor stripes 151 include some exposed portions, which are not covered with the data conductors 171 and 175, such as portions located between the source electrodes 173 and the drain electrodes 175.

The passivation layer 180 includes a lower passivation film 180p preferably comprising an inorganic insulator, such as silicon nitride or silicon oxide, and an upper passivation film 180q, preferably comprising an organic insulator. The organic insulator preferably has a dielectric constant less than about 4.0. In addition, the organic insulator may be photosensitive and provide a substantially flat surface.

The passivation layer 180 has a plurality of contact holes 182 exposing the end portions 179 of the data lines 171 and a plurality of contact holes 185 exposing the expansions 177 of the drain electrodes 175. The passivation layer 180 and the gate insulating layer 140 have a plurality of contact holes 181 exposing the end portions 129 of the gate lines 121. The upper passivation film 180q has a plurality of trapezoidal openings 188. The lower passivation film 180p and the gate insulating layer 140 have a plurality of contact holes 186 exposing the projections 139 of the capacitive electrodes 136 in the openings. The contact holes 181, 182, 185 and 186 may have inclined or stepped sidewalls that can be easily obtained by using an organic material.

A plurality of pixel electrodes 190 and a plurality of contact assistants 81 and 82 are formed on the passivation layer 180. The pixel electrodes 190 and contact assistants 81 and 82 preferably comprise transparent conductors, such as ITO or IZO, or reflective conductors, such as Ag, Al, Cr, or alloys thereof.

Each pixel electrode 190 has an approximately rectangular shape with chamfered left corners. The chamfered edges of the pixel electrode 190 form an angle of about 45 degrees with the gate lines 121. The pixel electrodes 190 overlap the gate lines 121 to increase the aperture ratio.

Each of the pixel electrodes 190 has a gap 92 that divides the pixel electrode 190 into an outer sub-pixel electrode 190a and an inner sub-pixel electrode 190b.

The gap 92 includes lower and upper portions 92a and 92b and a longitudinal portion connecting them. The lower and the upper portions 92a and 92b of the gap 92 extend from a right edge to a left edge of the pixel electrode 190 with forming an angle of about 45 degrees with the gate lines 121 in clockwise and counterclockwise directions, respectively. The longitudinal portion 92c of the gap 92 connects left ends of the lower and the upper portions 92a and 92b.

Accordingly, the inner sub-pixel electrode 190b has the shape of an isosceles trapezoid rotated by 90°, and the outer subpixel electrode 190a has the shape of a pair of right-angled trapezoids rotated by a right angle and a longitudinal connection connecting the right-angled trapezoids. It is preferable that the outer subpixel electrode 190a is wider than the inner subpixel electrode 190b, but the area of the outer subpixel electrode 190a is smaller than six times the area of the inner subpixel electrode 190b.

The outer subpixel electrode 190a is disposed on the upper passivation film 180q and connected to an expansion 177 of a drain electrode 175 through a contact hole 185.

The inner sub-pixel electrode 190b is disposed on the lower passivation film 180p in an opening 188 such that the top surface of the inner subpixel electrode 190b is lower than the top surface of the outer subpixel electrode 190a, as viewed from the perspective shown in FIG. 4. The boundaries of the opening 188 are disposed in the gap 92, thereby providing a height difference between the inner sub-pixel electrode 190b and the outer sub-pixel electrode 190a. The light leakage that may be caused by the height difference can be blocked by providing branches of the storage electrode lines 131 at the boundaries or by making the sidewalls of the openings 188 stepped or zigzag.

The inner sub-pixel electrode 190b is connected to a capacitive electrode 136 through a contact hole 186 and overlaps a coupling electrode 176. The inner sub-pixel electrode 190b, the capacitive electrode 136, and the coupling electrode 176 form a "coupling capacitor."

The inner sub-pixel electrode 190b has a cutout 91 extending in the transverse direction and has an inlet from the right edge of the pixel electrode 190. The inlet has a pair of inclined edges substantially parallel to the lower portion 92a and the upper portion 92b of the gap 92, respectively.

The pixel electrode 190 having the cutout 91 and the gap 92 has substantially an inversion symmetry with respect to the capacitive electrode 136. Individual portions 92a-92c of the gap 92 will be also referred to as cutouts hereinafter.

In other embodiments, the number of the cutouts or the number of the partitions may vary depending on design factors, such as the size of the pixel electrode 190, the ratio of the transverse edges and the longitudinal edges of the pixel electrode 190, the type and characteristics of the liquid crystal layer 3, and so on.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIGS. 2-4.

An insulating substrate 210 comprising, e.g., transparent glass or plastic, is provided. A light blocking member 220 (sometimes referred to as a black matrix) for preventing light leakage is formed on the insulating substrate 210. The light blocking member 220 has a plurality of openings 225 that face the pixel electrodes 190. The openings 225 may have substantially the same planar shape as the pixel electrodes 190. Alternatively, the light blocking member 220 may comprise a plurality of rectilinear portions aligned with and facing the data lines 171 on the TFT array panel 100, and a plurality of widened portions aligned with and facing the TFTs on the TFT array panel 100. The light blocking member 220 may include branches extending along the boundaries of the openings 188 on the TFT array panel 100 for preventing light leakage.

A plurality of color filters 230 are also formed on the substrate 210. The color filters 230 are disposed substantially in the areas enclosed by the light blocking member 220. The color filters 230 may extend substantially in the longitudinal direction along the pixel electrodes 190. The color filters 230 may represent one of the primary colors, such as red, green or blue.

An overcoat 250 is formed on the color filters 230 and the light blocking member 220. The overcoat 250 preferably comprises an (organic) insulator. The overcoat 250 prevents the color filters 230 from being exposed and provides a flat surface.

A common electrode 270 is formed on the overcoat 250. The common electrode 270 preferably comprises a transparent conductive material, such as ITO and IZO, and has a plurality of sets of cutouts 71, 72a and 72b.

A set of cutouts 71, 72a-72b face a pixel electrode 190 and include a center cutout 71, a lower cutout 72a, and an upper cutout 72b. Each of the cutouts 71, 72a-72b is disposed between adjacent cutouts 91, 92a-92b of the pixel electrode 190 or between a cutout 92a or 92b and a chamfered edge of the pixel electrode 190. Each of the cutouts 71, 72a-72b has at least an oblique portion having a depressed notch and extending parallel to the lower cutout 92a or the upper cutout 92b of the pixel electrode 190. The cutouts 71, 72a-72b have substantially an inversion symmetry with respect to a capacitive electrode 136.

Each of the lower and upper cutouts 72a and 72b includes an oblique portion extending approximately from a left edge of the pixel electrode 190 approximately to lower or upper edge of the pixel electrode 190, and transverse and longitudinal portions extending from respective ends of the oblique portion along edges of the pixel electrode 190, overlapping the edges of the pixel electrode 190, and forming obtuse angles with the oblique portion.

The center cutout 71 includes a central transverse portion extending approximately from the left edge of the pixel electrode 190 along the above-described transverse line, a pair of oblique portions extending from an end of the central transverse portion approximately to a right edge of the pixel electrode and forming oblique angles with the central transverse portion, and a pair of terminal longitudinal portions extending from the ends of the respective oblique portions along the right edge of the pixel electrode 190, overlapping the right edge of the pixel electrode 190, and forming obtuse angles with the respective oblique portions.

In other embodiments, the number of the cutouts 71, 72a-72b may vary depending on design factors, and the light blocking member 220 may also overlap the cutouts 71, 72a-72b to block the light leakage through the cutouts 71, 72a-72b.

Alignment layers 11 and 21 that may be homeotropic are coated on inner surfaces of the panels 100 and 200. Polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The retardation film has birefringence and provides a retardation opposite to that provided by the LC layer 3.

The LCD may further include a backlight unit (not shown) supplying light to the LC layer 3 through the polarizers 12 and 22, the retardation film, and the panels 100 and 200.

The thickness of the LC layer 3 on the outer subpixel electrode 190a is thinner than on the inner subpixel electrode 190b due to the difference in thickness of the passivation layer 180. It is preferable that the LC layer 3 have a negative dielectric anisotropy. The LC layer 3 is subjected to a vertical alignment such that the LC molecules 310 in the LC layer 3 are aligned such that their long axes are substantially vertical to the surfaces of the panels 100 and 200 in the absence of an electric field. Accordingly, incident light cannot pass the crossed polarization system 12 and 22.

The LCD shown in FIGS. 1-4 is represented as an equivalent circuit shown in FIG. 5.

Referring to FIG. 5, a pixel of the LCD includes a TFT Q, a first subpixel including a first LC capacitor Cka and a storage capacitor Cst, a second subpixel including a second LC capacitor Clcb, and a coupling capacitor Ccp.

The first LC capacitor Clca includes an outer sub-pixel electrode 190a as one terminal, a portion of the common electrode 270 corresponding thereto as the other terminal, and a portion of the LC layer 3 disposed therebetween as a dielectric. Similarly, the second LC capacitor Clcb includes an inner sub-pixel electrode 190b as one terminal, a portion of the common electrode 270 corresponding thereto as the other terminal, and a portion of the LC layer 3 disposed therebetween as a dielectric.

The storage capacitor Cst includes an expansion 177 of a drain electrode 175 as one terminal, a storage electrode 137 as the other terminal, and a portion of the gate insulating layer 140 disposed therebetween as a dielectric.

The coupling capacitor Ccp includes an inner sub-pixel electrode 190b and a capacitive electrode 136 as one terminal, a coupling electrode 176 as the other terminal, and portions of the passivation layer 180 and the gate insulating layer 140 disposed therebetween as a dielectric.

The first LC capacitor Clca and the storage capacitor Cst are connected in parallel to a drain of the TFT Q. The coupling capacitor Ccp is connected between the drain of the TFT Q and the second LC capacitor Clcb. The common electrode 270 is supplied with a common voltage Vcom and the storage electrode lines 131 may be supplied with the common voltage Vcom.

The TFT Q applies data voltages from a data line 171 to the first LC capacitor Clca and the coupling capacitor Ccp in response to a gate signal from a gate line 121, and the coupling capacitor Ccp transmits the data voltage with a modified magnitude to the second LC capacitor Clcb.

If the storage electrode line 131 is supplied with the common voltage Vcom and each of the capacitors Clca, Cst, Clcb and Ccp and the capacitances thereof are denoted as the same reference characters, the voltage Vb charged across the second LC capacitor Clcb is given by:

$$Vb = Va \times [Ccp/(Ccp+Clcb)],$$

where Va denotes the voltage of the first LC capacitor Clca.

Since the term $Ccp/(Ccp+Clcb)$ is smaller than one, the voltage Vb of the second LC capacitor Clcb is greater than that of the first LC capacitor Clca. This inequality may be also true for a case that the voltage of the storage electrode line 131 is not equal to the common voltage Vcom.

When the potential difference is generated across the first LC capacitor Clca or the second LC capacitor Clcb, an electric field substantially perpendicular to the surfaces of the panels 100 and 200 is generated in the LC layer 3. Both the pixel electrode 190 and the common electrode 190 are commonly referred to as field generating electrodes hereinafter. Then, the LC molecules 310 in the LC layer 3 tilt in response to the electric field such that their long axes are perpendicular to the field direction. The degree of the tilt of the LC molecules 310 determines the variation of the polarization of light incident on the LC layer 3 and the variation of the light polarization is transformed into the variation of the light transmittance by the polarizers 12 and 22. In this way, the LCD displays images.

The tilt angle of the LC molecules 310 depends on the strength of the electric field. Since the voltage Va of the first LC capacitor Clca and the voltage Vb of the second LC capacitor Clcb are different from each other, the tilt direction of the LC molecules 310 in the first subpixel is different from that in the second subpixel. Thus, the luminances of the two subpixels are different. Accordingly, while maintaining the average luminance of the two subpixels in a target luminance, the voltages Va and Vb of the first and the second subpixels can be adjusted so that an image viewed from a lateral side is the similar to an image viewed from the front, thereby improving the lateral visibility.

The ratio of the voltages Va and Vb can be adjusted by, for example, varying the capacitance of the coupling capacitor Ccp. The coupling capacitance Ccp can be varied by changing the overlapping area and distance between the coupling electrode 176 and the inner sub-pixel electrode 190b (and the capacitive electrode 136). For example, the distance between the coupling electrode 176 and the inner sub-pixel electrode 190b becomes large when the capacitive electrode 136 is removed and the coupling electrode 176 is moved to the position of the capacitive electrode 136.

Since the thickness of the LC layer 3 in the first subpixel is less than the thickness in the second subpixel, the improvement of the lateral visibility is easily realized, which will be described in greater detail below. The thickness of the LC layer 3 may be referred to as the cell gap.

The voltage Vb charged in the second LC capacitor Clcb may be larger than the voltage Va of the first LC capacitor Clca. This can be realized by precharging the second LC capacitor Clcb with a predetermined voltage, such as the common voltage Vcom.

The inner sub-pixel electrode 190b of the second subpixel is preferably about 0.8 to about 1.5 times wider than the outer subpixel electrode 190a of the first subpixel. The number of sub-pixel electrodes in each of the LC capacitors Clca and Clcb may vary in other embodiments.

The tilt direction of the LC molecules 310 is determined by a horizontal component generated by the cutouts 91, 92a-92b and 71, 72a-72b of the field generating electrodes 190 and 270 and the oblique edges of the pixel electrodes 190 distorting the electric field, which is substantially perpendicular to the edges of the cutouts 91, 92a-92b and 71, 72a-72b and the oblique edges of the pixel electrodes 190. Referring to FIG. 3, a set of the cutouts 91, 92a-92b and 71, 72a-72b divides a pixel electrode 190 into a plurality of sub-areas and each sub-area has two major edges. Since the LC molecules 310 on each sub-area tilt perpendicular to the major edges, the azimuthal distribution of the tilt directions are localized to four directions, thereby increasing the reference viewing angle of the LCD.

The notches in the cutouts 71, 72a-72b determine the tilt directions of the LC molecules 310 on the cutouts 71, 72a-

72b. The notches in the cutouts 71, 72a-72b may be provided at the cutouts 91, 92a-92b and may have various shapes and arrangements.

The shapes and the arrangements of the cutouts 91, 92a-92b and 71, 72a-72b for determining the tilt directions of the LC molecules 310 may be modified and at least one of the cutouts 91, 92a-92b and 71, 72a-72b can be substituted with protrusions (not shown) or depressions (not shown). The protrusions preferably comprise an organic or inorganic material and are disposed on or under the field-generating electrodes 190 or 270.

Figure 6:
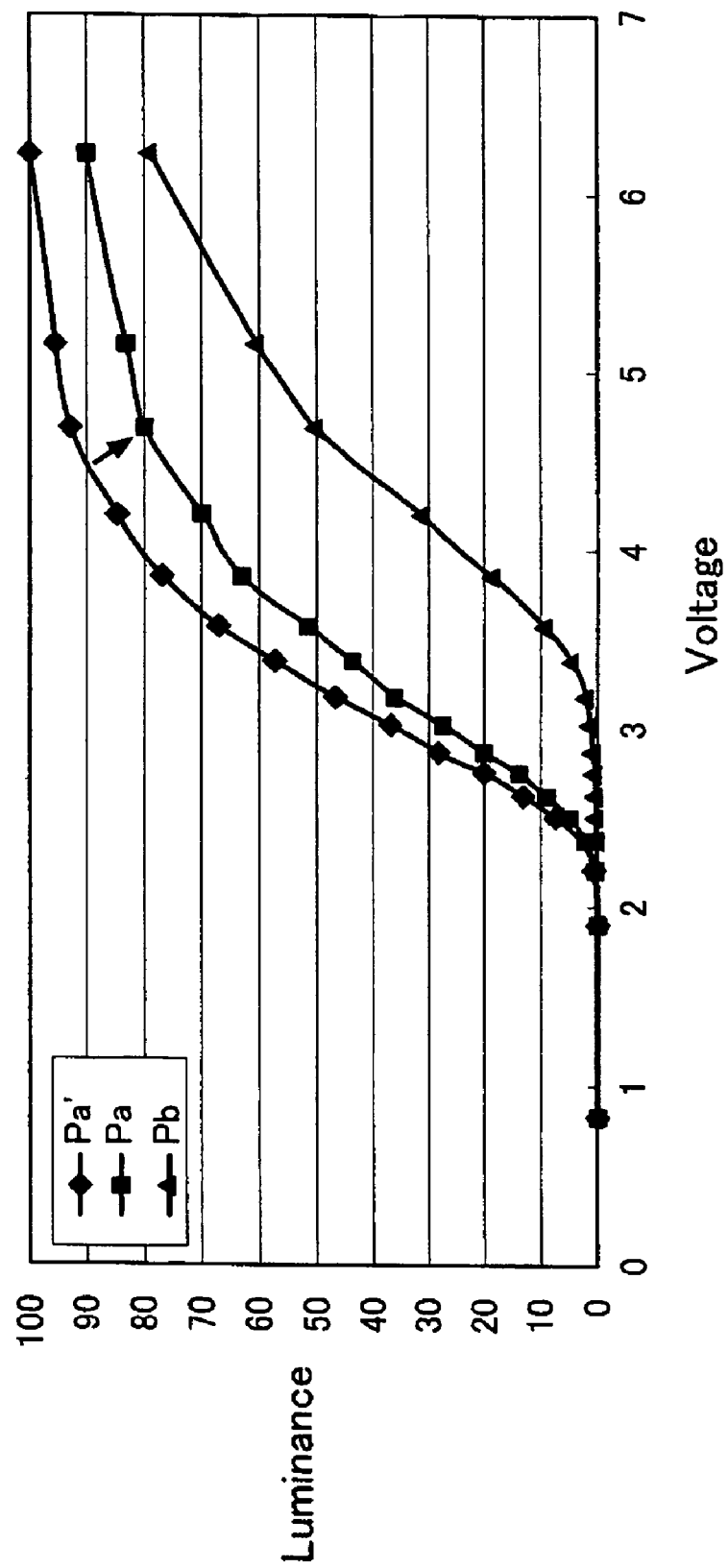
FIG. 6 is a graph illustrating the luminance of two subpixels as function of the applied voltage with and without cell gap difference between the subpixels.
Figure 7:
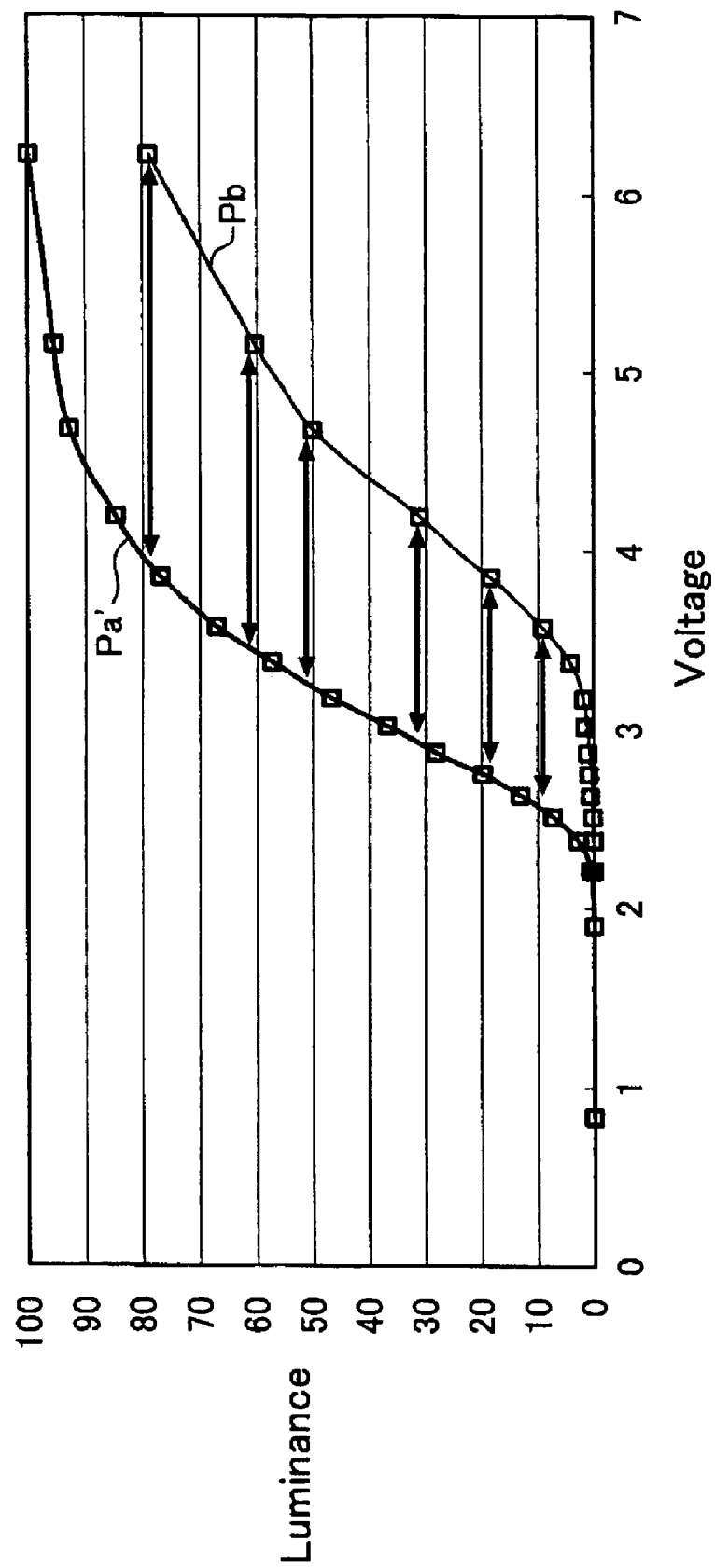
FIG. 7 is a graph illustrating the luminance of two subpixels as function of the applied voltage without cell gap difference between the subpixels.
Figure 8:
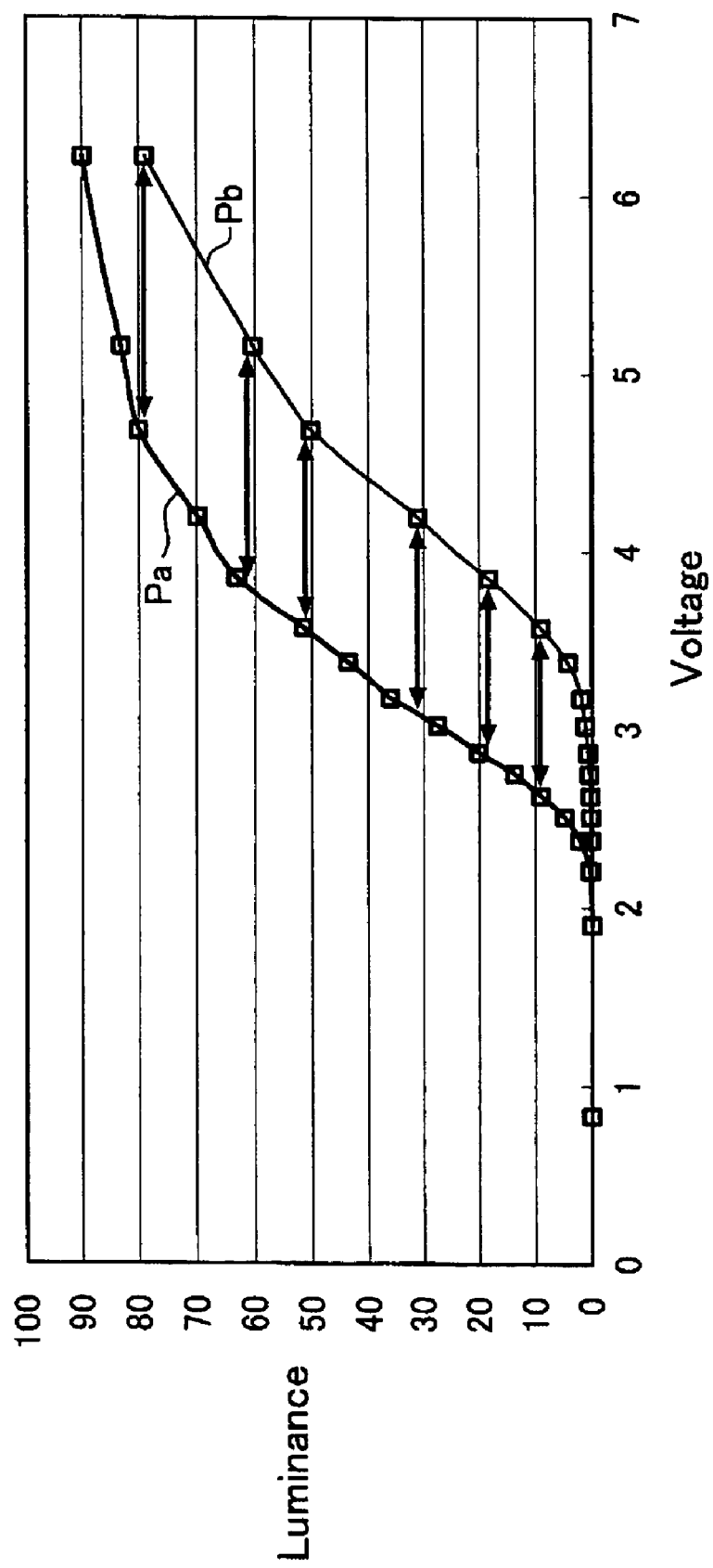
FIG. 8 is a graph illustrating the luminance of two subpixels as function of the applied voltage without cell gap difference between the subpixels.

Referring to FIGS. 6, 7 and 8, the relationship between the luminance and the cell gap will be described in detail.

FIG. 6 is a graph illustrating the luminance of two subpixels as function of the applied voltage with and without a cell gap difference between the subpixels. FIG. 7 is a graph illustrating the luminance of two subpixels as function of the applied voltage without a cell gap difference between the subpixels. FIG. 8 is a graph illustrating the luminance of two subpixels as function of the applied voltage without a cell gap difference between the subpixels.

The measurement was performed for a pixel divided into first and second subpixels. The first subpixel and the second subpixel had the same area and were designed so that the voltage of the second subpixel was 0.74 times the voltage of the first subpixel.

In FIGS. 6 and 8, the curve denoted by Pa is a luminance curve of the first subpixel when the cell gap of the first subpixel was 0.3 microns smaller than that of the second pixel, the curve denoted by Pa' is a luminance curve of the first subpixel when the cell gaps in the first and the second subpixels were equal to each other, and the curve denoted by Pb is a luminance curve of the second subpixel.

As shown in FIG. 6, the luminance curve Pa with the cell gap difference has a reduced gradient as compared with the luminance curve Pa' without the cell gap difference.

As shown in FIG. 7, when the cell gap is equal in both subpixels, the voltage difference between the two subpixels required to achieve the same luminance for both subpixels increases as the luminance increases. As a result, the actual luminance of the LCD may not match the designed luminance.

As shown in FIG. 8, when the cell gap of the first subpixel was smaller than the cell gap of the second subpixel, the voltage difference between the two subpixels required to achieve the same luminance for both subpixels remains relatively constant independent of the magnitude of the luminance.

Accordingly, by reducing the cell gap of the first pixel the voltage difference can be kept constant regardless of the magnitude of the grays. Thus, the actual luminance of the LCD can approach the designed luminance.

When the data voltage suitable for a conventional pixel is used for embodiments in which each pixel is divided into first and second subpixels, the luminance of the first subpixel may be equal to the portion of the luminance of the conventional pixel corresponding to the region of the first subpixel. However, the luminance of the second subpixel is less than the portion of the luminance of the conventional pixel corresponding to the region of the second subpixel. As a result, the total combined luminance of the first and second subpixels may be lower than the total luminance of the conventional pixel. It is possible to compensate for the decrease of total luminance of a pixel caused by the decrease in the luminance of the second subpixel by raising the gray voltages at all of the subpixels or by employing a LC material having a high refractive anisotropy.

The selective variation of the luminance in the first pixel may be also realized by varying local retardation in the first subpixel or in the second subpixel, for example, by locally differentiating the refractive anisotropy of the first subpixel and the second subpixel.

An LCD according to another embodiment of the present invention will be described in detail with reference to FIG. 9.

Figure 9:
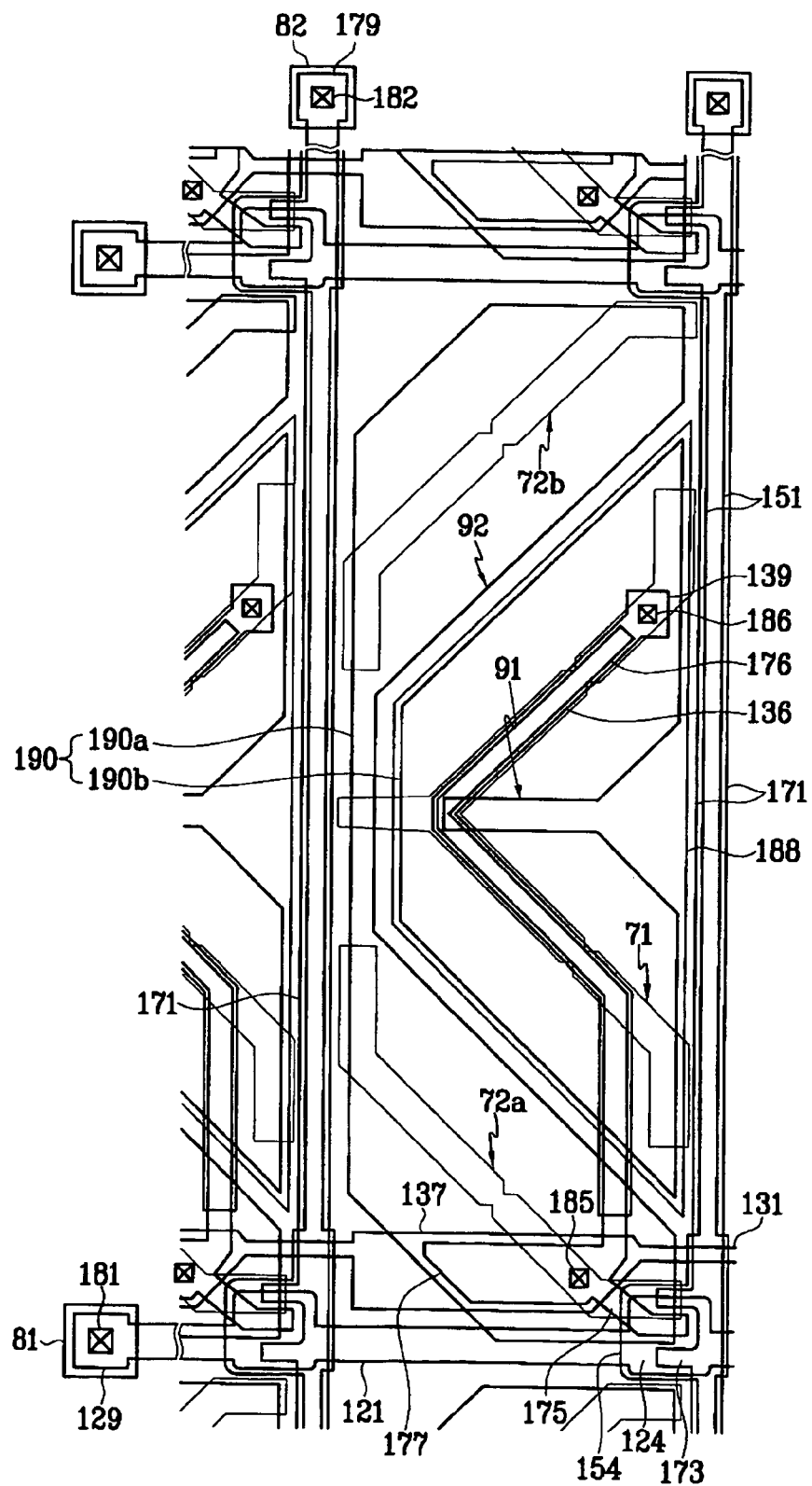
FIG. 9 is a layout view of an LCD according to another embodiment of the present invention.

FIG. 9 is a layout view of an LCD according to another embodiment of the present invention.

A layered structure of the LCD according to this embodiment is similar to that of the LCD shown in FIGS. 1-4 and will be described by using the same reference numerals as those shown in FIGS. 1-4.

An LCD according to the embodiment shown in FIG. 9 also includes a TFT array panel 100, a common electrode panel 200, a LC layer 3 interposed between the panels 100 and 200, and a pair of polarizers 12 and 22 attached on outer surfaces of the panels 100 and 200.

Regarding the TFT array panel 100, a plurality of gate lines 121 including gate electrodes 124 and end portions 129, a plurality of storage electrode lines 131 including storage electrodes 137, and a plurality of capacitive electrodes 136 are formed on a substrate 110. A gate insulating layer 140, a plurality of semiconductor stripes 151 including projections 154, and a plurality of ohmic contacts 161 and 165 including projections 163 are sequentially formed on the gate lines 121 and the storage electrodes lines 131. A plurality of data lines 171, including source electrodes 173 and end portions 179, and a plurality of drain electrodes 175, including expansions 177 and coupling electrodes 176, are formed on the ohmic contacts 161 and 165. A passivation layer 180, including lower and upper films 180p and 180q, is formed on the data lines 171, the drain electrodes 175, and exposed portions of the semiconductor stripes 151. A plurality of contact holes 181 are provided in the passivation layer 180 and the gate insulating layer 140, a plurality of contact holes 182 and 185 are provided in the passivation layer 180. A plurality of openings 188 are provided in the upper passivation film 180q. A plurality of contact holes 186 are provided in the lower passivation film 180p. A plurality of pixel electrodes 190 including subpixel electrodes 190a and 190b and having cutouts 91-92 and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 71, 72a-72b, and an alignment layer 21 are formed on an insulating substrate 210, as shown in FIGS. 2-4.

In contrast with the LCD shown in FIGS. 1-4, each of the coupling electrodes 176 extends upward from an expansion 177 of a drain electrode 175 and, after reaching the center cutout 71 of the common electrode 270, the coupling electrode substantially follows the path of the center cutout 71. The capacitive electrode 136 has substantially the same shape as the coupling electrode 176 except for a projection 139 for contact with a subpixel electrode 190b.

The coupling electrodes 176 and the capacitive electrodes 136 block light leakage near the cutouts 71 and useless portions of a transmissive area occupied by the electrodes 176 and 136 are reduced, thereby increasing the aperture ratio.

Many of the above-described features of the LCD shown in FIGS. 1-4 may be appropriate to the LCD shown in FIG. 9.

An LCD according to another embodiment of the present invention will be described in detail with reference to FIGS. 10 and 11.

Figure 10:
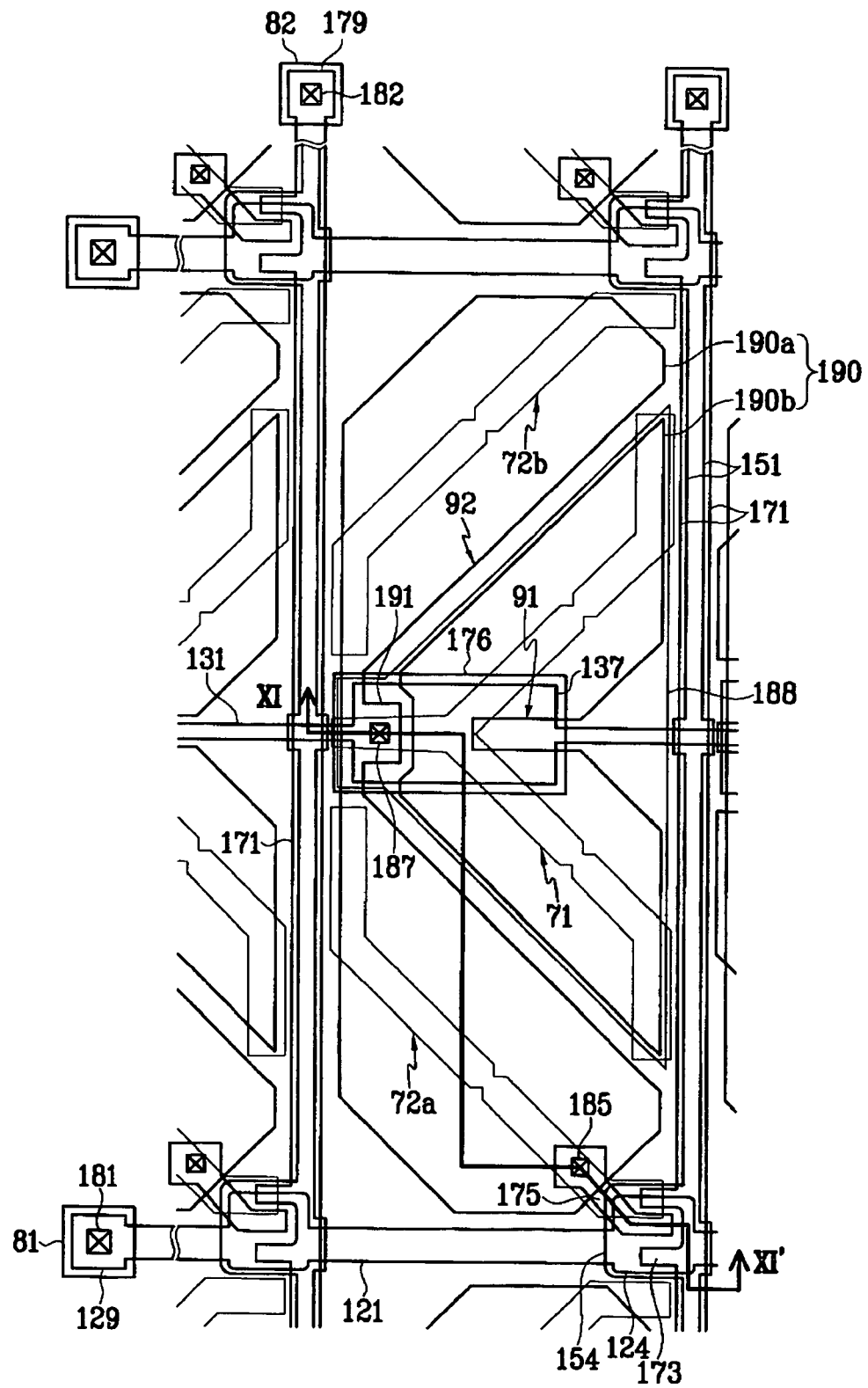
FIG. 10 is a layout view of an LCD according to another embodiment of the present invention.

FIG. 10 is a layout view of an LCD according to another embodiment of the present invention, and FIG. 11 is a sectional view of the LCD shown in FIG. 10 taken along line XI-XI'.

Referring to FIGS. 10 and 11, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are similar to those shown in FIGS. 1-4, with differences described in greater detail below.

Regarding the TFT array panel 100, a plurality of gate lines 121, including gate electrodes 124 and end portions 129, and a plurality of storage electrode lines 131, including storage electrodes 137, are formed on a substrate 110. A gate insulating layer 140, a plurality of semiconductor stripes 151, and a plurality of ohmic contacts 161 and 165 are sequentially formed on the gate lines 121 and the storage electrodes lines 131. A plurality of data lines 171, including source electrodes 173 and end portions 179, a plurality of drain electrodes 175, and a plurality of coupling electrodes 176 are formed on the ohmic contacts 161 and 165 and the gate insulating layer 140. A passivation layer 180 including lower and upper films 180p and 180q is formed on the data lines 171, the drain electrodes 175, the coupling electrodes 176, and exposed portions of the semiconductor stripes 151. A plurality of contact holes 181 are provided in the passivation layer 180 and the gate insulating layer 140, a plurality of contact holes 182 and 185 are provided in the passivation layer 180, and a plurality of openings 188 are provided in the upper passivation film 180q. A plurality of pixel electrodes 190 including outer and inner subpixel electrodes 190a and 190b and having cutouts 91-92 and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 71, 72a-72b, and an alignment layer 21 are formed on an insulating substrate 210.

In contrast with the LCD shown in FIGS. 1-4, the LCD shown in FIGS. 10-11 do not include a capacitive electrode.

Each of the storage electrode lines 131 is equidistant from adjacent two gate lines 121, and the storage electrodes 137 extend over both the outer and the inner subpixel electrodes 190a and 190b. The coupling electrodes 176 fully overlap the storage electrodes 137 and are physically disconnected from the drain electrodes 175. The drain electrodes 175 do not include an expansion overlapping the storage electrode lines 131.

The openings 188 are also disposed on entire portions of the coupling electrodes 176, and the lower film 180p has a plurality of contact holes 187 disposed in the openings 188 and exposing the coupling electrodes 176.

Each of the outer subpixel electrodes 190a includes lower and upper portions and a longitudinal portion connecting the lower and the upper portions. The longitudinal portion has a projection 191 connected to a coupling electrode 176 through a contact hole 187.

Many of the above-described features of the LCD shown in FIGS. 1-4 are applicable to the LCD shown in FIGS. 10 and 11.

Now, a method of manufacturing the TFT array panel shown in FIGS. 10 and 11 will be described in detail with reference to FIGS. 12A-17 as well as FIGS. 10 and 11.

FIGS. 12A, 13A, 14A and 16A are layout views of the TFT array panel shown FIGS. 10 and 11 in intermediate steps of a manufacturing method thereof according to an embodiment of the present invention. FIGS. 12B, 13B, 14B and 16B are sectional views of the TFT array panel shown in FIGS. 12A, 13A, 14A and 16A taken along lines XIIB-XIIB', XIIIB-XIIIB', XIVB-XIVB', and XVB-XVB', FIG. 15 is a sectional view of the TFT array panel shown in FIG. 14A taken along line XIV-XIV' in the step following the step shown in FIG. 14B, and FIG. 17 is a sectional view of the TFT array panel shown in FIG. 16A taken along line XVIB-XVIB' in the step following the step shown in FIG. 16B.

Figure 12A:
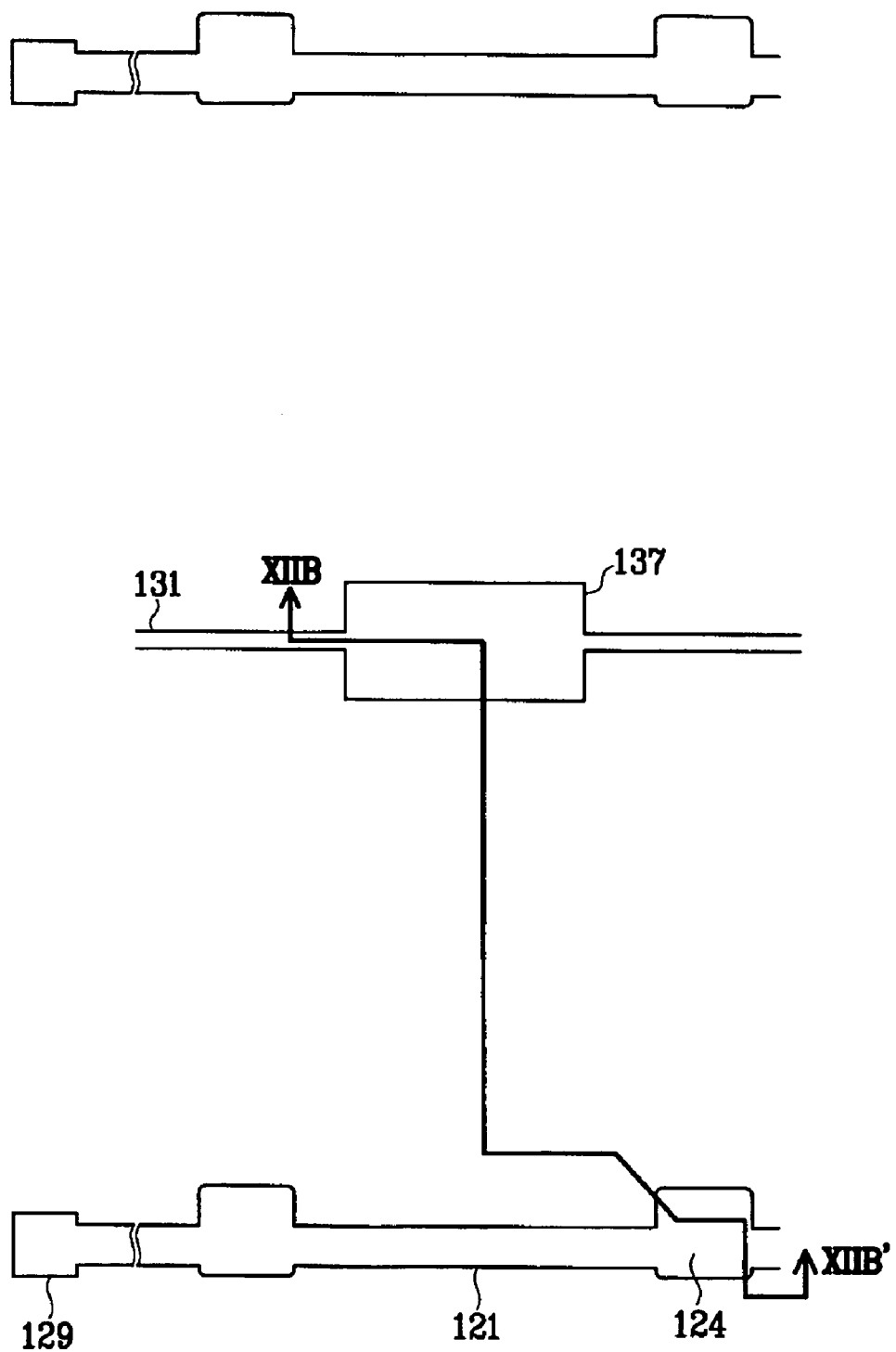
FIGS. 12A, 13A, 14A and 16A are layout views of the TFT array panel shown FIGS. 10 and 11 in intermediate steps of a manufacturing method thereof according to an embodiment of the present invention.
Figure 12B:
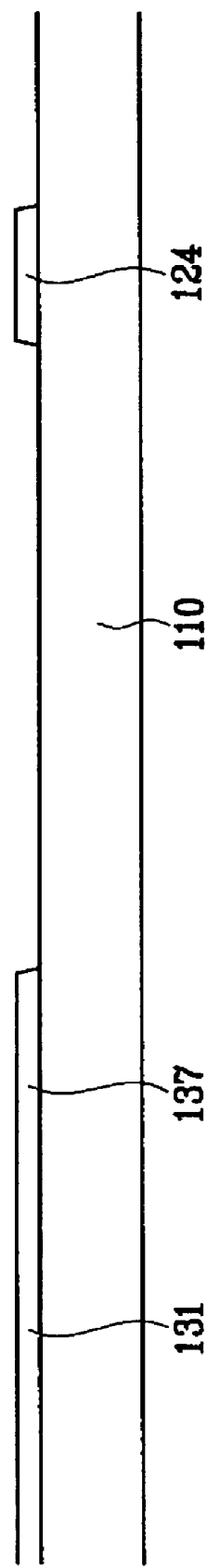
FIGS. 12B, 13B, 14B and 16B are sectional views of the TFT array panel shown in FIGS. 12A, 13A, 14A and 16A taken along lines XIIB-XIIB', XIIIB-XIIIB', XIVB-XIVB', and XVIB-XVIB'.

Referring to FIGS. 12A and 12B, a conductive layer preferably comprising metal is deposited on an insulating substrate 110 by, e.g., sputtering. The conductive layer is then subjected to lithography and etching to form a plurality of gate lines 121, including gate electrodes 124 and end portions 129, and a plurality of storage electrode lines 131, including storage electrodes 137.

Figure 13A:
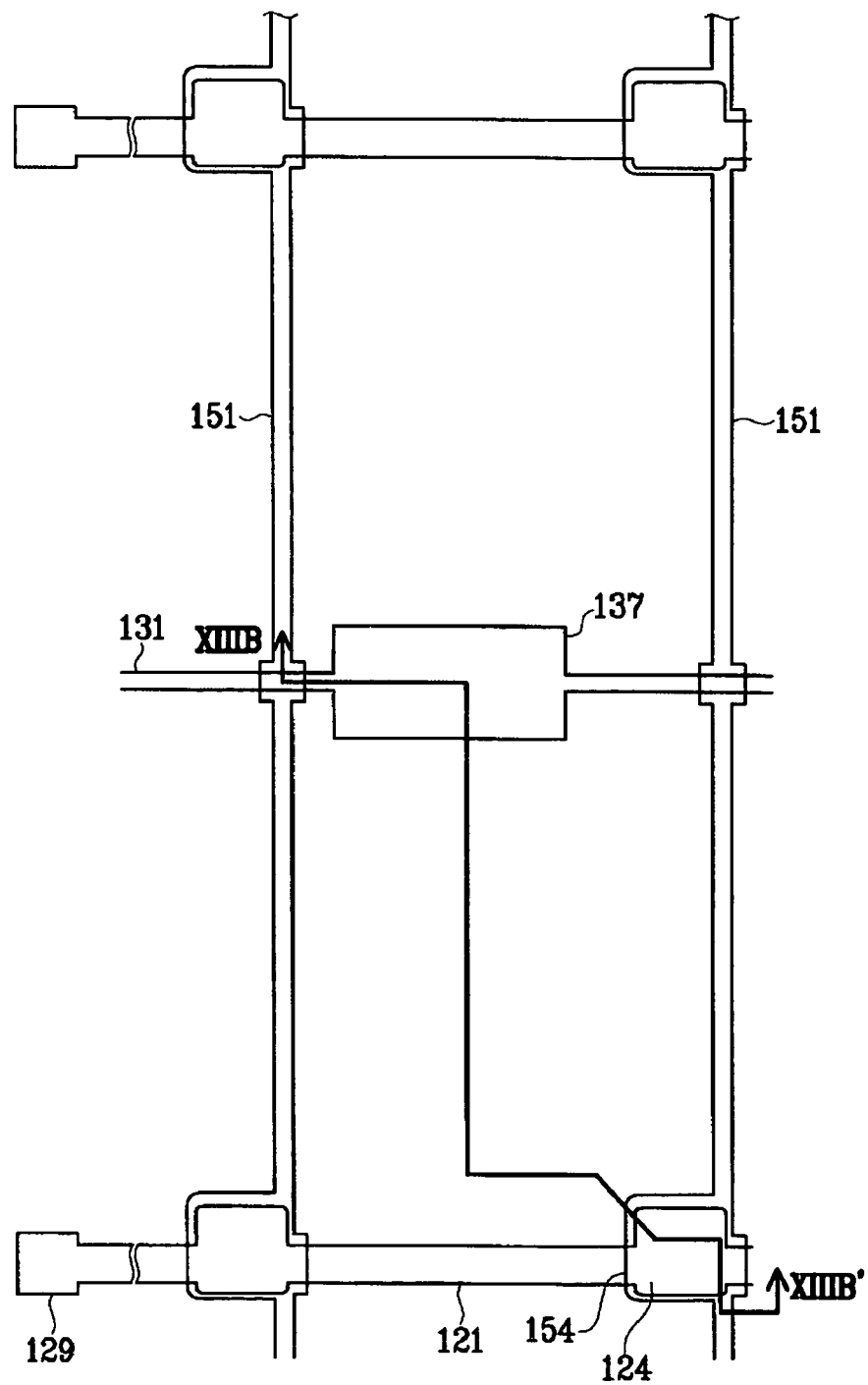
Figure 13B:
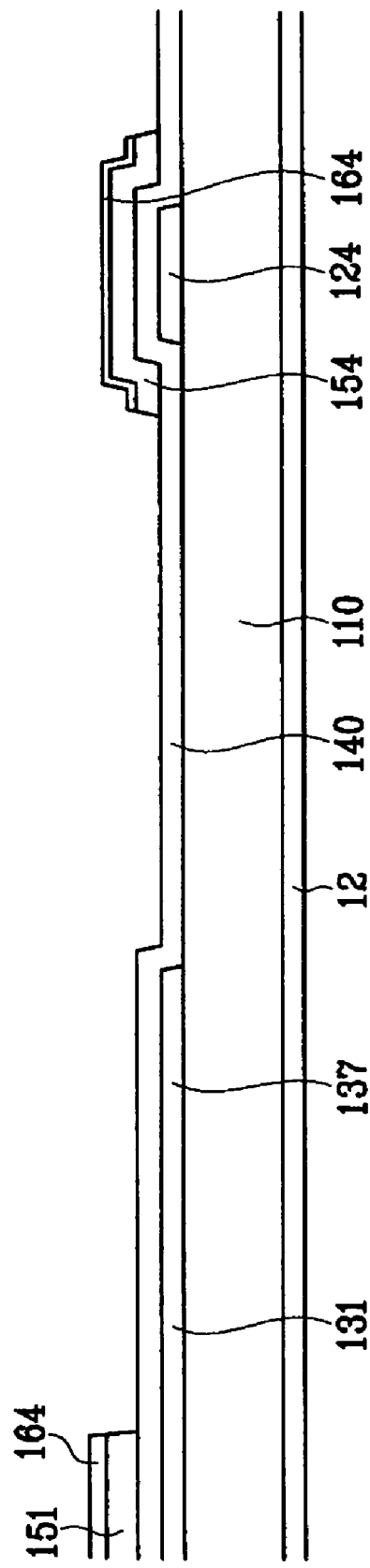

Referring to FIGS. 13A and 13B, a gate insulating layer 140, an intrinsic amorphous silicon layer, and an extrinsic amorphous silicon layer are sequentially deposited. The extrinsic amorphous silicon layer and the intrinsic amorphous silicon layer are patterned by lithography and etching to form a plurality of extrinsic semiconductor stripes 164 and a plurality of intrinsic semiconductor stripes 151 including projections 154.

Figure 14A:
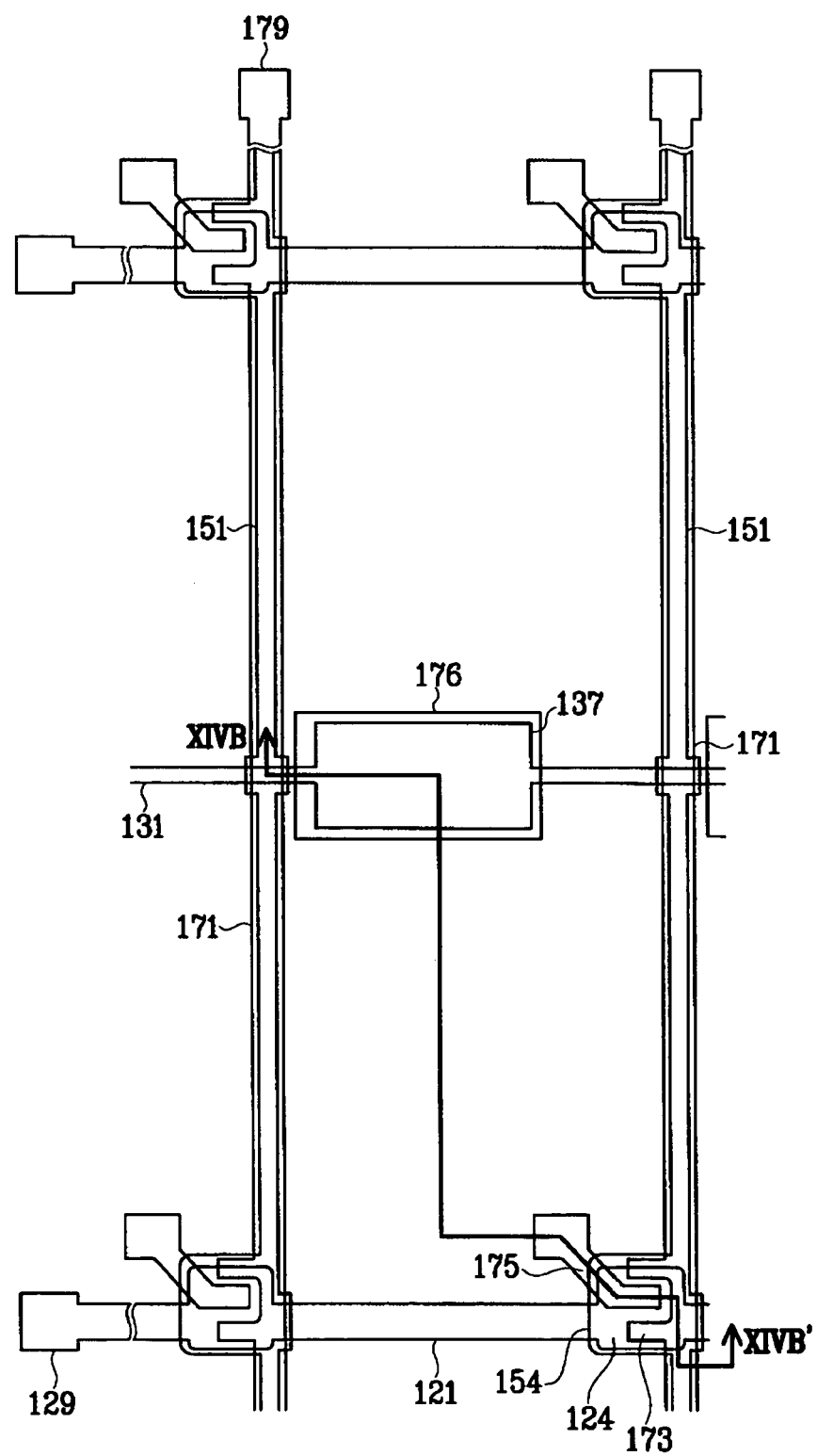
Figure 14B:
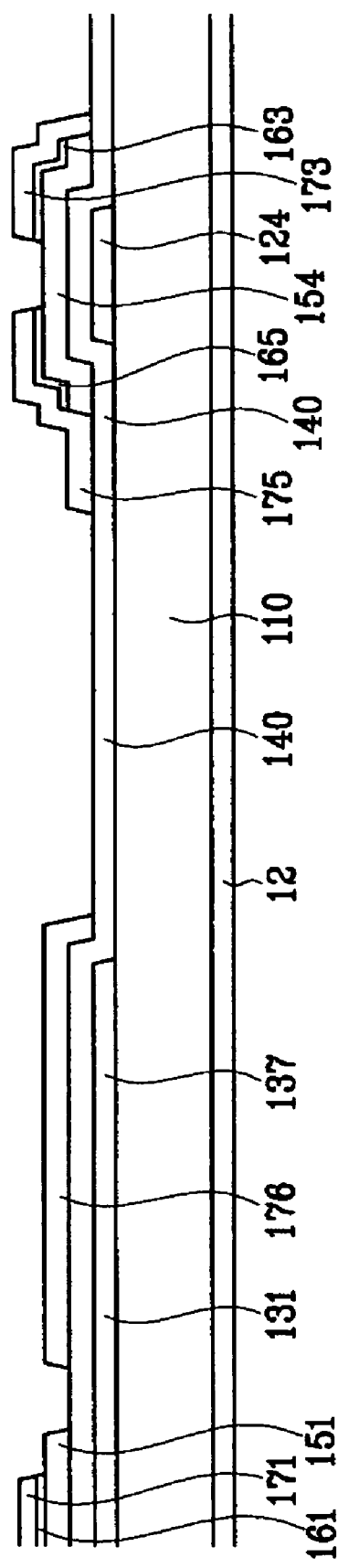
Figure 15:
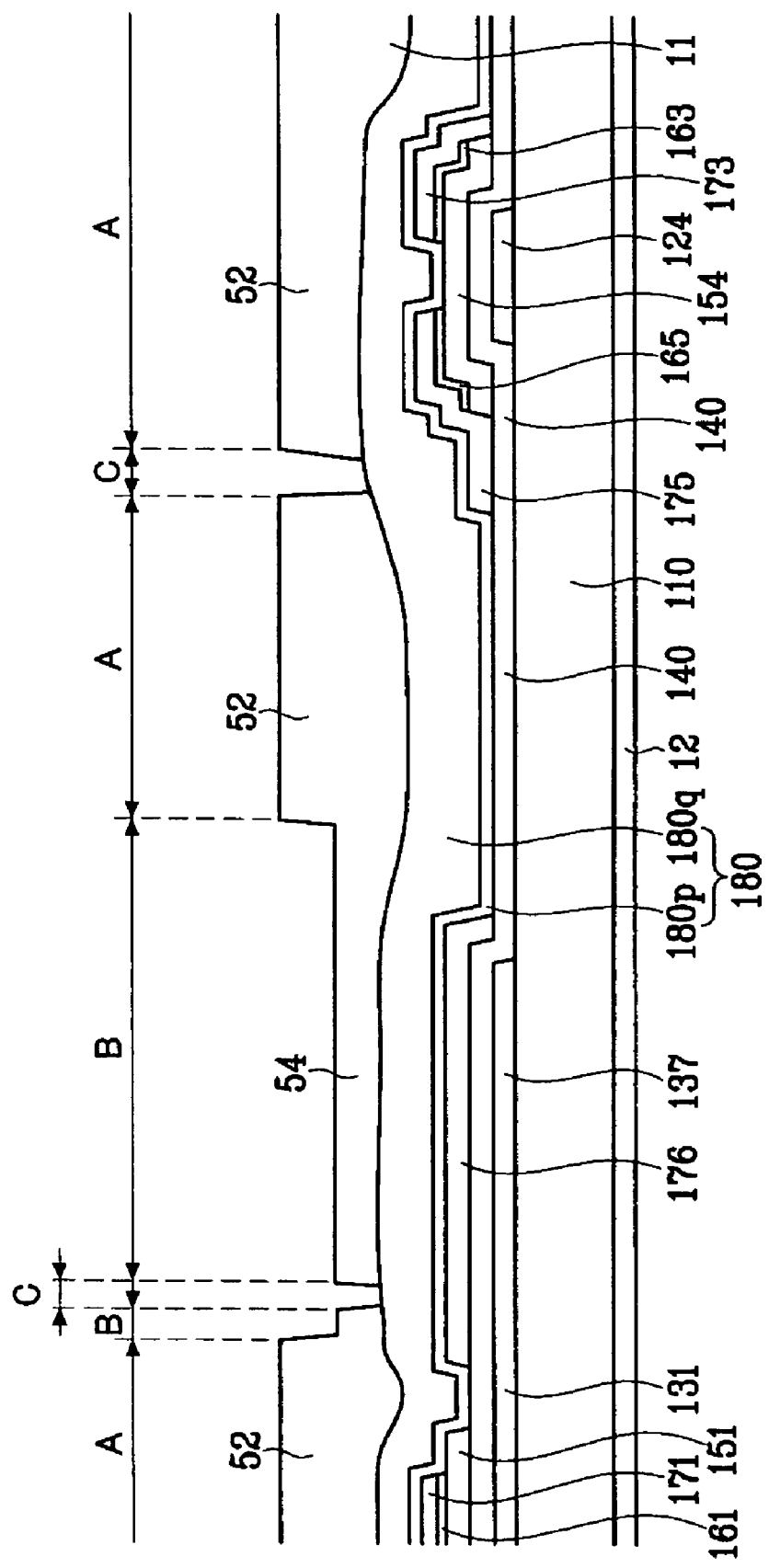
FIG. 15 is a sectional view of the TFT array panel shown in FIG. 14A taken along line XIVB-XIVB' in the step following the step shown in FIG. 14B.

Referring to FIGS. 14A and 14B, a conductive layer is deposited by, e.g., sputtering, and patterned by lithography and etching to form a plurality of data lines 171, including source electrodes 173 and end portions 179, a plurality of drain electrodes 175, and a plurality of coupling electrodes 176.

Thereafter, exposed portions of the extrinsic semiconductor stripes, which are not covered with the data lines 171 and the drain electrodes 175, are removed to complete a plurality of ohmic contact islands 161 and 165 and to expose portions of the intrinsic semiconductor stripes 151. Oxygen plasma treatment preferably follows in order to stabilize the exposed surfaces of the semiconductor stripes 151.

Referring to FIG. 15, a lower film 180p and an upper film 180q are deposited. A photoresist masking member including thick portions 52 disposed on areas A and thin portions 54 on areas B is formed on the upper film 180q. Areas C have no photoresist.

The position-dependent thickness of the masking member 52 and 54 can be obtained by several techniques, for example, by providing translucent areas on the exposure mask as well as transparent areas and light blocking opaque areas. The translucent areas may have a slit pattern, a lattice pattern, or a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern comprising a reflowable material is formed by using a normal exposure mask having only transparent areas and opaque areas, the photoresist pattern is subject to a reflow process to flow onto areas without the photoresist, thereby forming thin portions.

Exposed portions of the upper and the lower films 180q and 180p and the gate insulating layer 140 on the areas C are removed to form a plurality of contact holes 181, 182, 185 and 187. At this time, only the upper portions of the contact holes 181, 182, 185 and 187 may be formed.

Figure 16A:
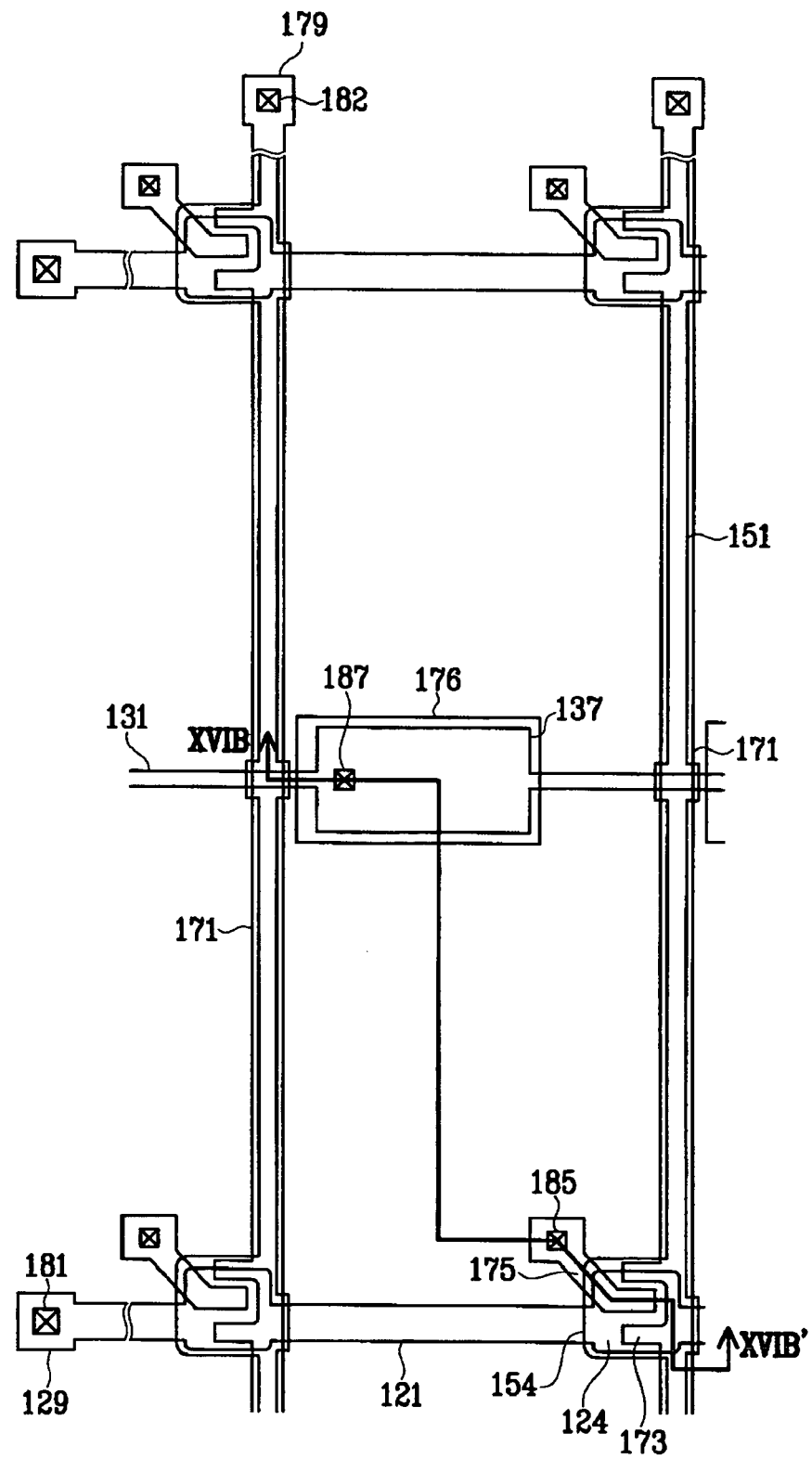
Figure 16B:
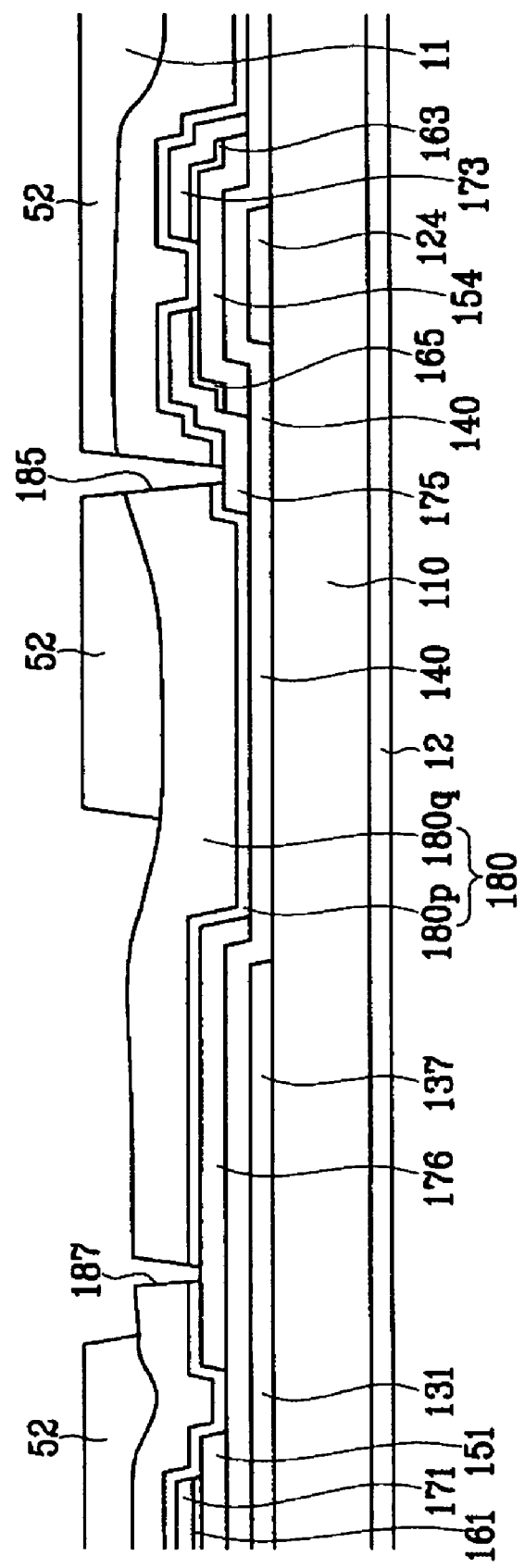
Figure 17:
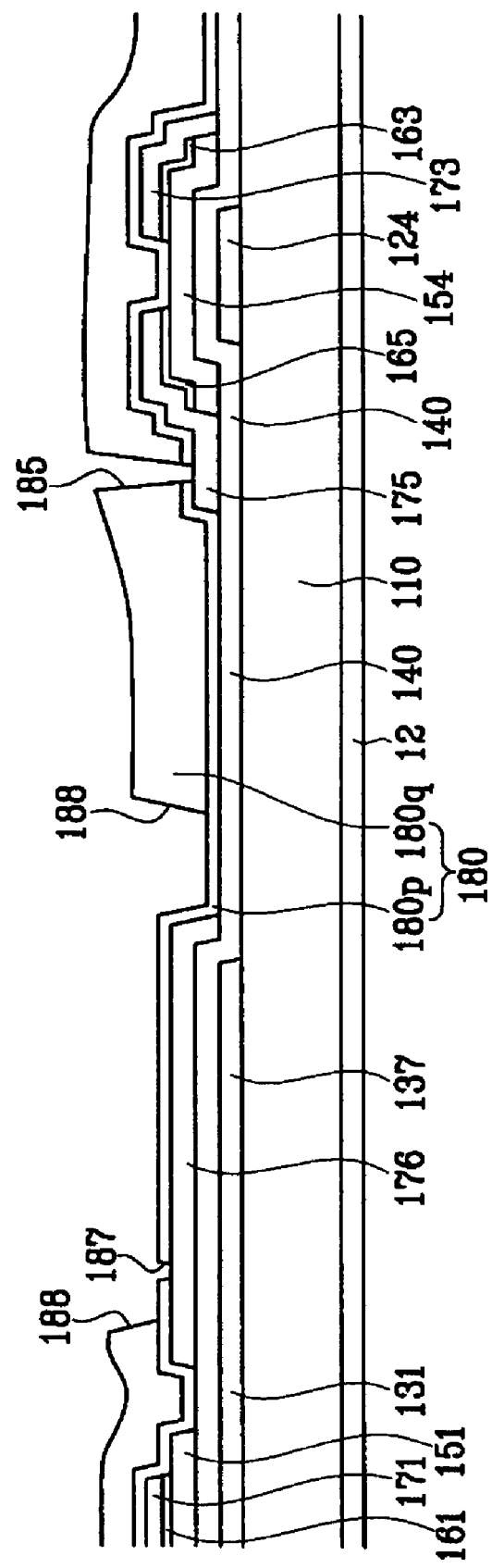
FIG. 17 is a sectional view of the TFT array panel shown in FIG. 16A taken along line XVIB-XVIB' in the step following the step shown in FIG. 16B.

Referring to FIGS. 16A and 16B, the masking member 52 and 54 is subjected to thickness reduction by, e.g. ashing, until the thin portions 54 are removed to expose the surface of the upper film 180q. The thick portions 52 remain over portions of the upper film 180q, as shown in FIG. 16B.

Referring to FIG. 17, the exposed portions of the upper film 180q are removed to form a plurality of openings 188. As described above, only the upper portions of the contact holes 181, 182, 185 and 187 may have previously been formed. During the formation of the openings 188, the unremoved portions of the layers 180q, 180p and 140 corresponding to the lower portions of the contact holes 181, 182, 185 and 187 are also removed.

Finally, an ITO or IZO layer having a thickness of about 500 Å to about 1,500 Å is deposited by, e.g., sputtering, and patterned by lithography and etching to form a plurality of pixel electrodes 190 and a plurality of contact assistants 81 and 82, as shown in FIGS. 10 and 11.

An LCD according to another embodiment of the present invention will be described in detail with reference to FIGS. 18 and 19.

Figure 18:
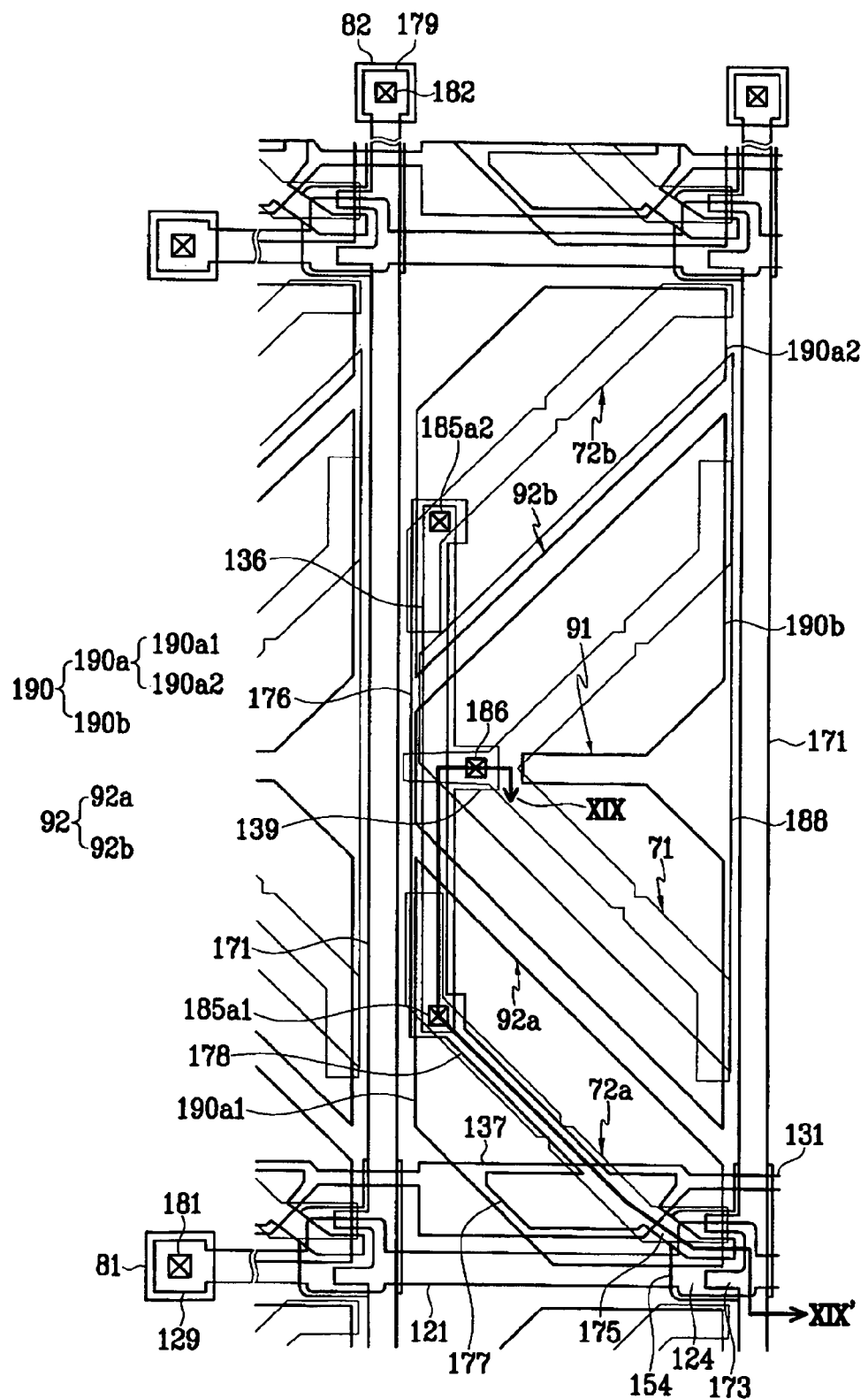
FIG. 18 is a layout view of an LCD according to another embodiment of the present invention.
Figure 19:
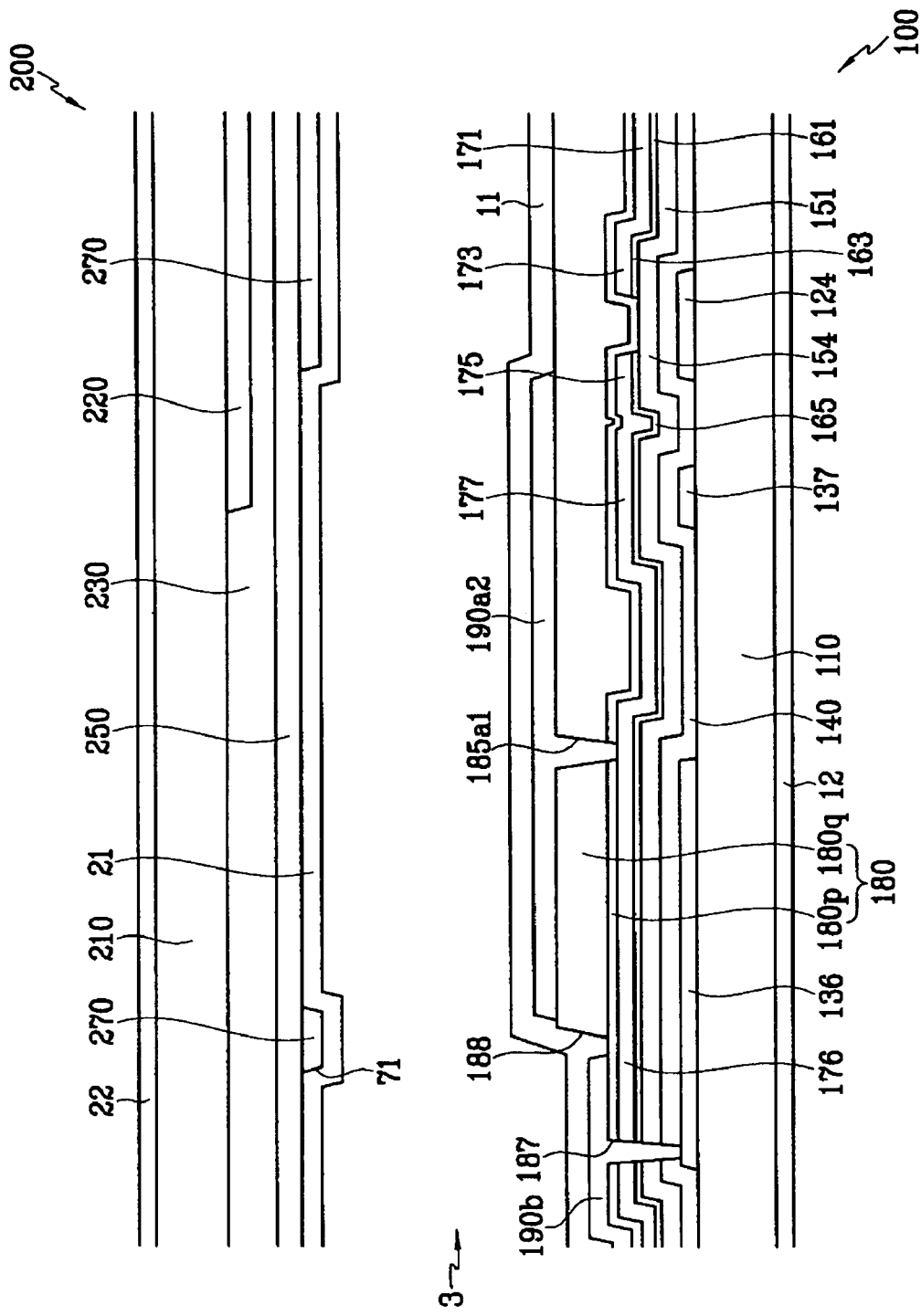
FIG. 19 is a sectional view of the LCD shown in FIG. 18 taken along line XIX-XIX'.

FIG. 18 is a layout view of an LCD according to another embodiment of the present invention, and FIG. 19 is a sectional view of the LCD shown in FIG. 18 taken along line XIX-XIX'.

Referring to FIGS. 18 and 19, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are similar to those shown in FIGS. 1-4, with differences described in greater detail below.

Regarding the TFT array panel 100, a plurality of gate lines 121, including gate electrodes 124 and end portions 129, a plurality of storage electrode lines 131, including storage electrodes 137, and a plurality of capacitive electrodes 136 are formed on a substrate 110. A gate insulating layer 140, a plurality of semiconductor stripes 151 including projections 154, and a plurality of ohmic contacts 161 and 165 including projections 163 are sequentially formed on the gate lines 121 and the storage electrodes lines 131. A plurality of data lines 171, including source electrodes 173 and end portions 179, and a plurality of drain electrodes 175, including expansions 177 and coupling electrodes 176, are formed on the ohmic contacts 161 and 165 and the gate insulating layer 140. A passivation layer 180 including lower and upper films 180p and 180q is formed on the data lines 171, the drain electrodes 175, and exposed portions of the semiconductor stripes 151. A plurality of contact holes 181 are provided in the passivation layer 180 and the gate insulating layer 140, a plurality of contact holes 182 are provided in the passivation layer 180. A plurality of openings 188 are provided in the upper passivation film 180q. A plurality of contact holes 186 are provided in the lower passivation film 180p. A plurality of pixel electrodes 190, including outer and inner subpixel electrodes 190a and 190b and having cutouts 91-92, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 71, 72a-72b, and an alignment layer 21 are formed on an insulating substrate 210.

In contrast with the LCD shown in FIGS. 1-4, each of the outer subpixel electrodes 190a is divided into lower and upper portions 190a1 and 190a2 (referred to as lower and upper subpixel electrodes 190a1 and 190a2 hereinafter) disposed opposite each other with respect to an inner subpixel electrode 190b. That is, each cutout 92 includes two oblique portions 92a and 92b rectilinearly penetrating a pixel electrode 190. Therefore, there is no longitudinal portion of the cutout 92 (as shown in FIG. 1) and no longitudinal connection of the outer subpixel electrode 190a.

Accordingly, the inner subpixel electrode 190b extends to the left edge of the pixel electrode 190, thereby reducing the pixel area consumed by the cutout 92 and increasing the light transmittance of the LCD. In addition, the extension of the inner subpixel electrode 190b reduces the longitudinal portion of the outer subpixel electrode 190a which may contribute to the reduction of light transmittance.

Each of the capacitive electrodes 136 is disposed near a left edge of a pixel electrode 190 and is elongated parallel to the data lines 171 to extend over the lower and upper subpixel electrodes 190a1 and 190a2. The capacitive electrode 136 includes a projection 139 projecting to the right to be exposed by a contact hole 186 and connected to an inner subpixel electrode 190b. The contact hole 186 is disposed on a straight line extending from a cutout 91, which does not belong to an effective display area, thereby improving display characteristics.

Each of the coupling electrodes 176 overlaps a capacitive electrode 136 and resembles the shape of the capacitive electrode 136 except for the projection 139. Each of the drain electrodes 175 further includes an interconnection 178 connecting the expansion 177 and the coupling electrode 176 thereof. The interconnection 178 obliquely extends along a cutout 72a to block the light leakage on the cutout 72a and to increase the aperture ratio.

The passivation layer 180 has pairs of contact holes 185a1 and 185a2 exposing both end portions of a coupling electrode 176 such that the lower and upper subpixel electrodes 190a1 and 190a2 are connected to the coupling electrode 176 through the contact holes 185a and 185b, respectively.

The aperture ratio of the LCD shown in FIGS. 18 and 19 was calculated to be increased by about 4-5% as compared with the LCD shown in FIGS. 1-4.

In addition, the semiconductor stripes 151 have almost the same planar shapes as the data lines 171 and the drain electrodes 175, as well as the underlying ohmic contacts 161 and 165. However, the semiconductor stripes 151 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171 and the drain electrodes 175, the semiconductor stripes 151, and the ohmic contacts 161 and 165 using a single photolithography step.

A photoresist masking pattern for the photolithography process has a position-dependent thickness, and in particular, has thicker portions and thinner portions. The thicker portions are located on wire areas that will be occupied by the data lines 171 and the drain electrodes 175, and the thinner portions are located on channel areas of TFTs. The position-dependent thickness of the photoresist is obtained by the above-described techniques with reference FIG. 15.

Many of the above-described features of the LCD shown in FIGS. 1-4 may be appropriate to the LCD shown in FIGS. 18 and 19.

An LCD according to another embodiment of the present invention will be described in detail with reference to FIGS. 20, 21, 22 and 23.

Figure 20:
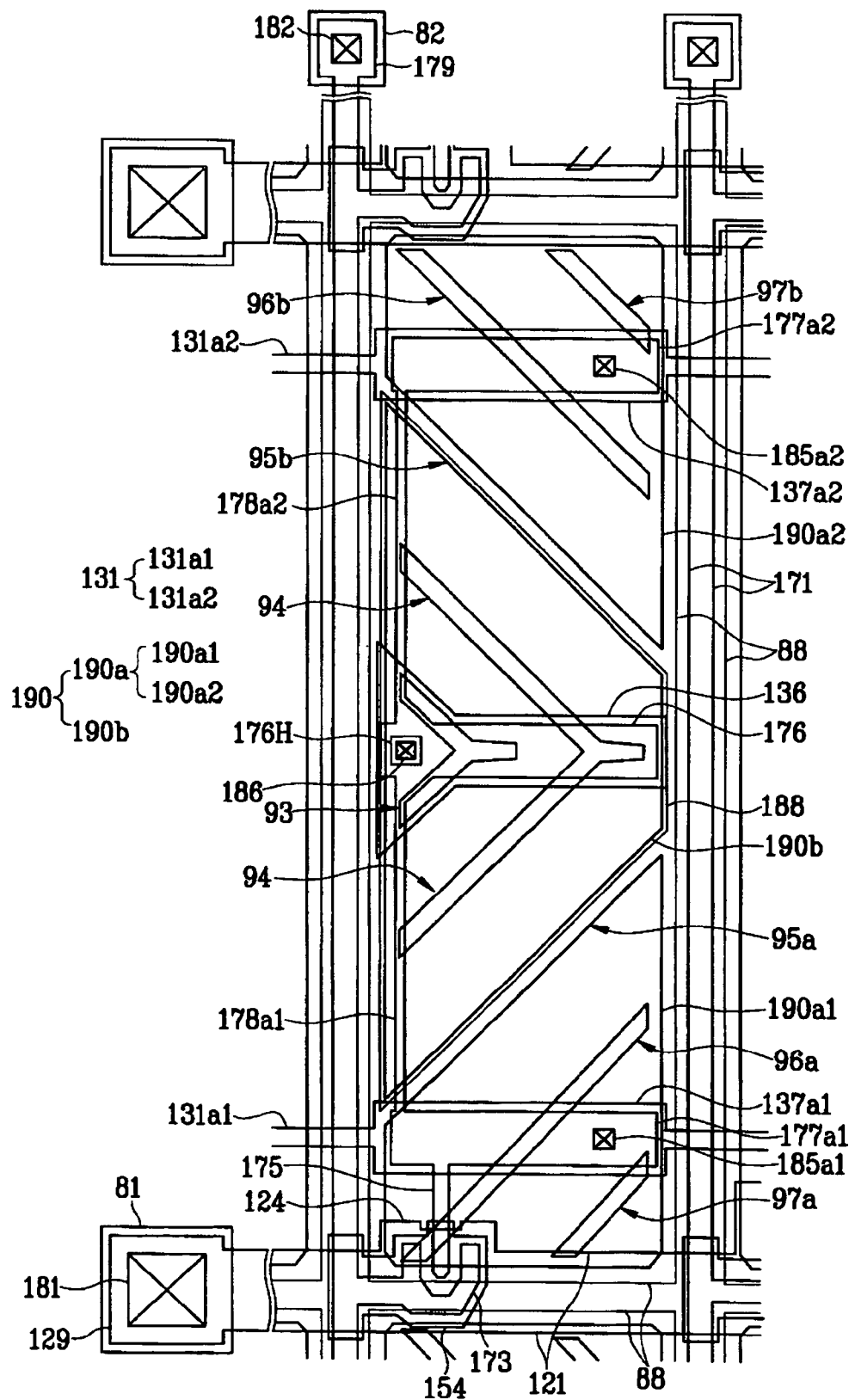
FIG. 20 is a layout view of a TFT array panel of an LCD according to another embodiment of the present invention.
Figure 21:
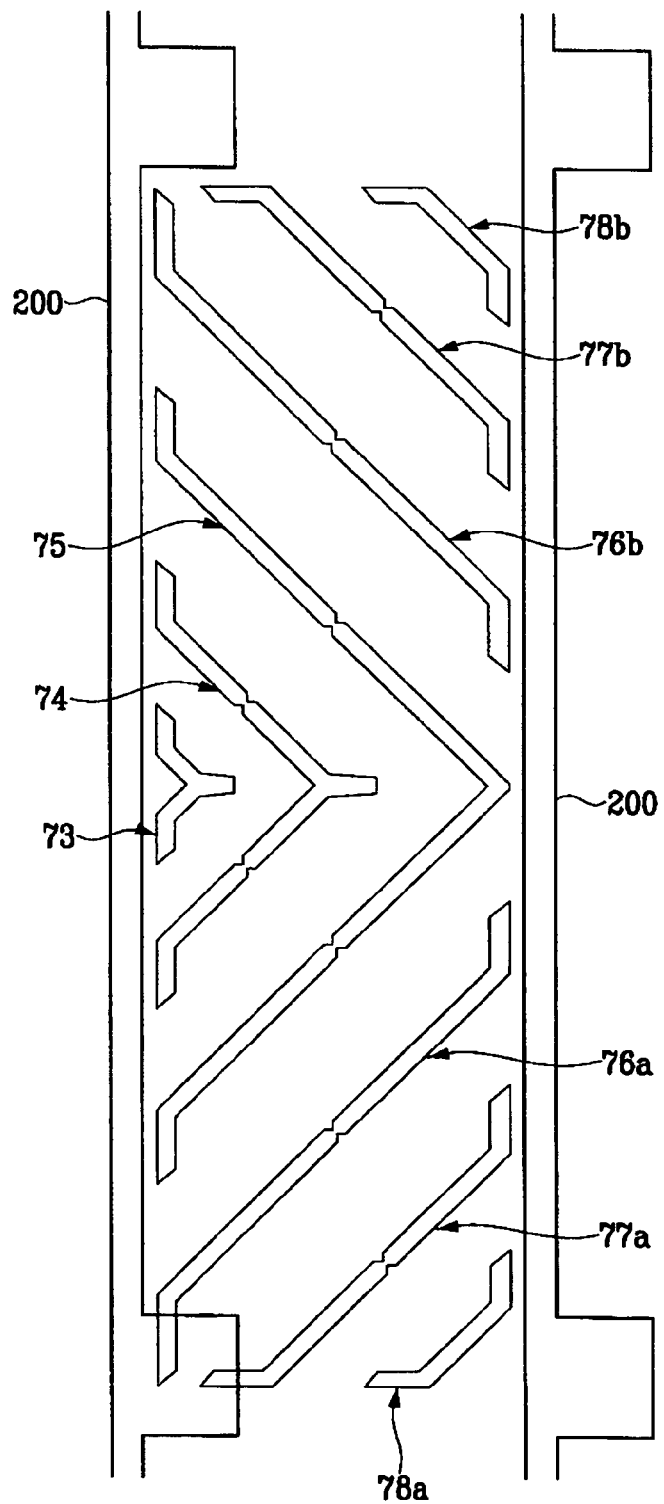
FIG. 21 is a layout view of a common electrode panel of an LCD according to another embodiment of the present invention.
Figure 22:
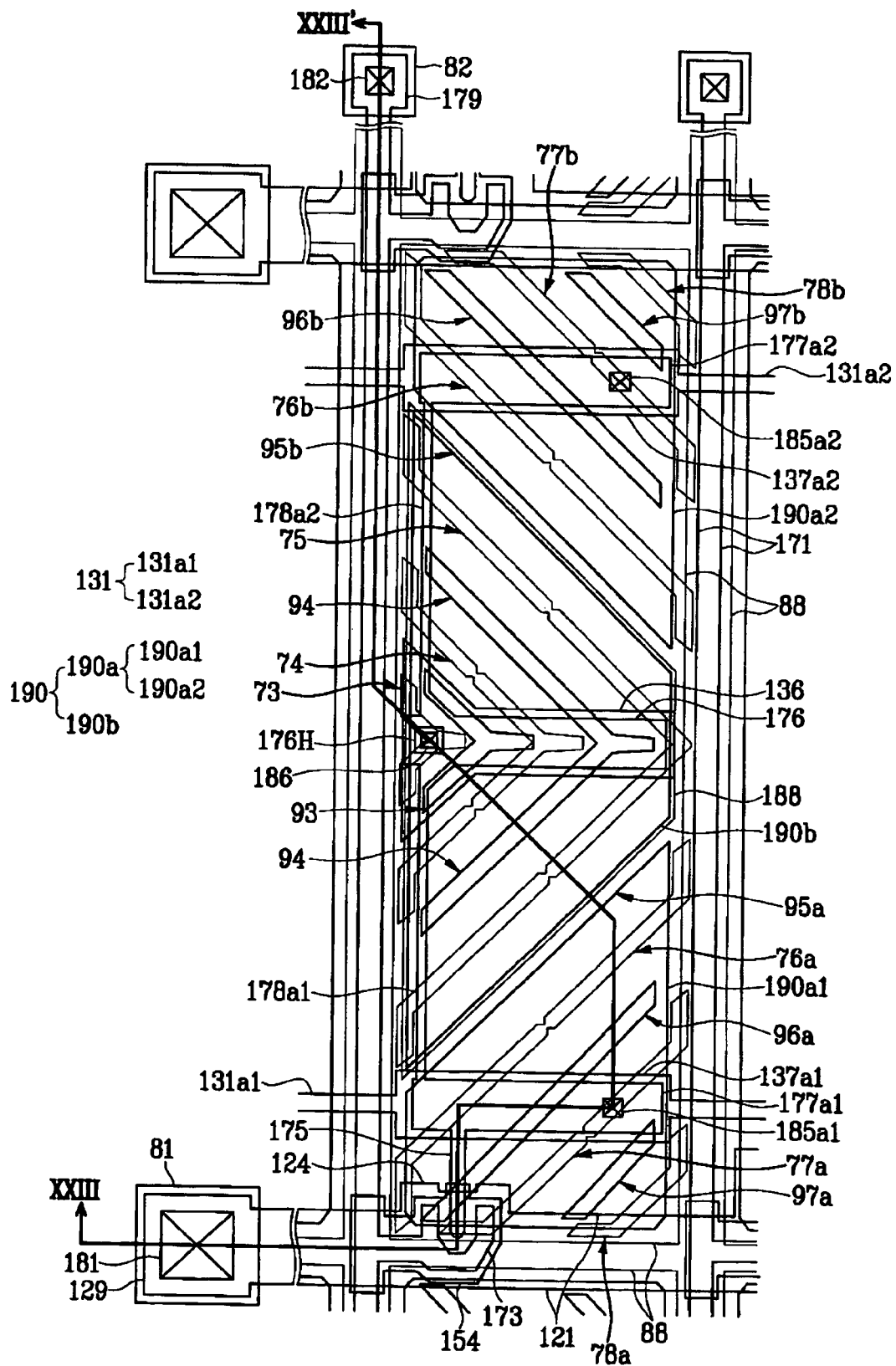
FIG. 22 is a layout view of an LCD including the TFT array panel shown in FIG. 20 and the common electrode panel shown in FIG. 21.
Figure 23:
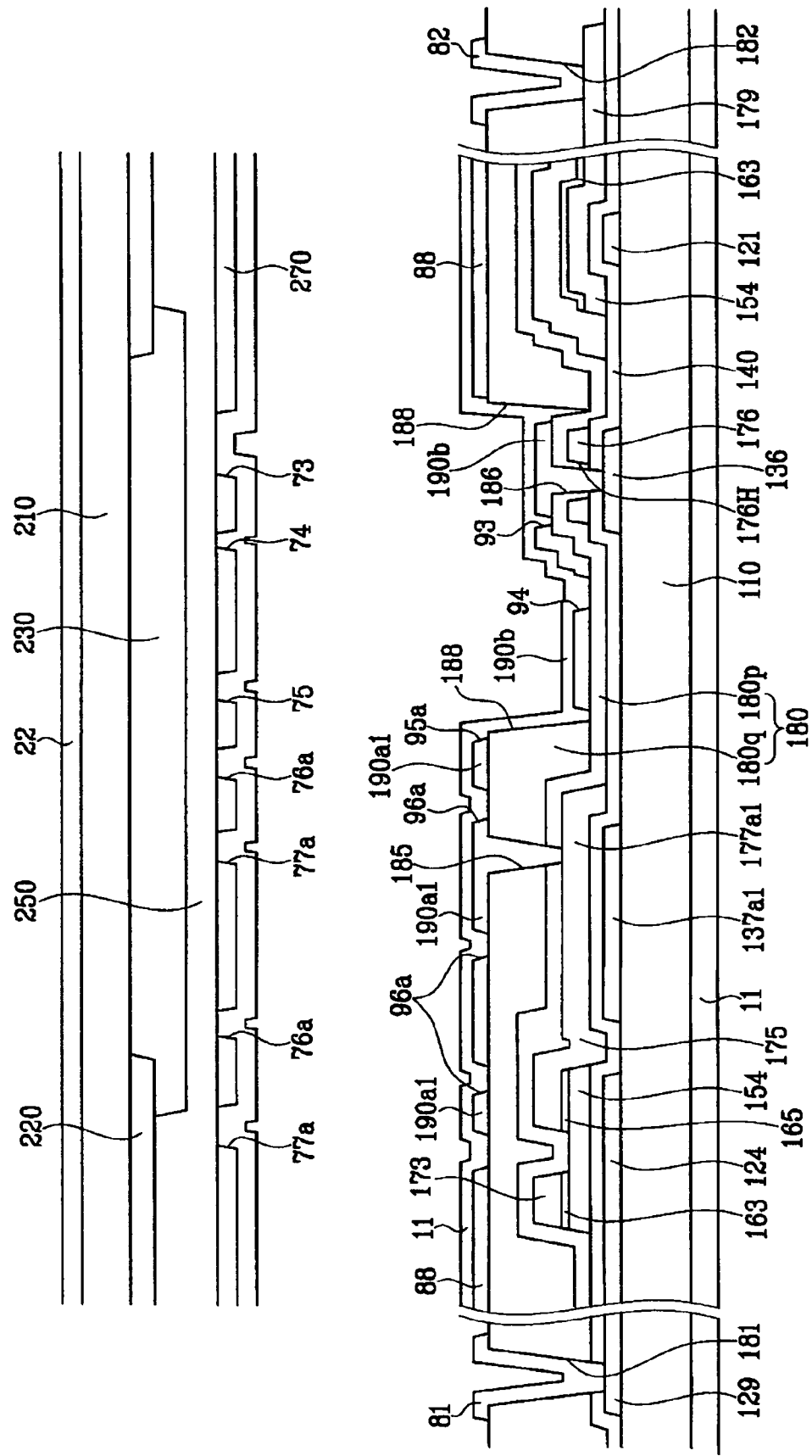
FIG. 23 is a sectional view of the LCD shown in FIG. 22 taken along line XXIII-XXIII'.

FIG. 20 is a layout view of a TFT array panel of an LCD according to another embodiment of the present invention, FIG. 21 is a layout view of a common electrode panel of an LCD according to another embodiment of the present invention, FIG. 22 is a layout view of an LCD including the TFT array panel shown in FIG. 20 and the common electrode panel shown in FIG. 21, and FIG. 23 is a sectional view of the LCD shown in FIG. 22 taken along line XXIII-XXIII'.

Referring to FIGS. 20-23, an LCD according to this embodiment also includes a TFT array panel 100, a common electrode panel 200, a LC layer 3 interposed between the panels 100 and 200, and a pair of polarizers 12 and 22 attached to outer surfaces of the panels 100 and 200.

Layered structures of the panels 100 and 200 according to this embodiment are similar to those shown in FIGS. 1-4, with differences described in greater detail below.

Regarding the TFT array panel 100, a plurality of gate lines 121, including gate electrodes 124 and end portions 129, and a plurality of storage electrode lines 131 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171, including source electrodes 173 and end portions 179, and a plurality of drain electrodes 175 are formed on the ohmic contacts 163 and 165 and the gate insulating layer 140. A passivation layer 180, including lower and upper films 180p and 180q, is formed on the data lines 171, the drain electrodes 175, and exposed portions of the semiconductor stripes 151. A plurality of contact holes 181 are provided in the passivation layer 180 and the gate insulating layer 140, a plurality of contact holes 182 are provided in the passivation layer 180, a plurality of openings 188 are provided in the upper passivation film 180q, and a plurality of contact holes 186 are provided in the lower passivation film 180p. A plurality of pixel electrodes 190 and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270, and an alignment layer 21 are formed on an insulating substrate 210.

Each of the storage electrodes 131 includes a pair of lower and upper stems 131a1 and 131a2 extending substantially parallel to the gate lines 121. Each of the storage electrode lines 131 is disposed between two adjacent gate lines 121, and the lower and the upper stems 131a1 and 131a2 are disposed close to lower and upper one of the two adjacent gate lines 121, respectively. The lower and the upper stems 131a1 and 131a2 include lower and upper storage electrodes 137a1 and 137a2, respectively, expanding upward and downward.

Each of the capacitive electrodes 136 has a rectangular shape elongated parallel to the gate lines 121. Each of the capacitive electrodes 136 is disposed between a pair of lower and upper storage electrodes 137a1 and 137a2. Each of the capacitive electrodes 136 is substantially equidistant from the lower and the upper storage electrodes 137a1 and 137a2 and from adjacent two gate lines 121. Each of the capacitive electrodes 136 includes a funneled left end portion that has oblique edges forming an angle of about 45 degrees with the gate lines 121.

The semiconductors 154 comprise islands disposed on the gate electrodes 124 and include extensions covering edges of the gate lines 121, which smooth the profile of the surface to prevent the disconnection of the data lines 171. The ohmic contacts 163 and 165 are also islands located in pairs on the semiconductor islands 154. A plurality of other semiconductor islands (not shown) and other ohmic contacts may be disposed on the storage electrode lines 131, which smooth the profile of the surface to prevent the disconnection of the data lines 171 there.

The source electrodes 173 have a U-shaped curve.

Each drain electrode 175 includes a lower expansion 177a1, an upper expansion 177a2, and a central expansion 176, and a pair of interconnections 178a1 and 178a2 connecting the expansions 177a1, 177a2, and 176. Each of the expansions 177a1, 177a2, and 176 have a rectangular shape elongated parallel to the gate lines 121. The interconnections 178a1 and 178a2 connect the expansions 177a1, 177a2, and 176 near left sides thereof and extend substantially parallel to the data lines 171.

The lower and upper expansions 177a1 and 177a2 overlap lower and upper storage electrodes 137a1 and 137a2, respectively.

The central expansion 176 overlaps a capacitive electrode 136 and may be referred to as a "coupling electrode." The coupling electrode 176 has a through-hole 176H exposing a top surface of the gate insulating layer 140 near a left end portion. The coupling electrode 176 has roughly the same shape as the capacitive electrode 136.

The passivation layer 180 further includes a plurality of contact holes 185a1 and 185a2 exposing the lower and the upper expansions 177a1 and 177a2 of the drain electrodes 175, respectively. The contact holes 186 penetrate the through-holes 176H and expose the end portions of the capacitive electrodes 136.

Each pixel electrode 190 has a roughly rectangular shape having four chamfered corners. The chamfered edges of the pixel electrode 190 form an angle of about 45 degrees with the gate lines 121.

Each of the pixel electrodes 190 includes lower and upper gaps 95a and 95b that divide the pixel electrode 190 into a lower sub-pixel electrode 190a1, an upper sub-pixel electrode 190a2, and a central sub-pixel electrode 190b. The lower and the upper gaps 95a and 95b obliquely extend from a left edge to a right edge of the pixel electrode 190 such that the central sub-pixel electrode 190b has an isosceles trapezoidal shape rotated by a right angle, and the lower and the upper sub-pixel electrodes 190a1 and 190a2 have right-angled trapezoidal shapes rotated by a right angle. The lower and the upper gaps 95a and 95b form an angle of about 45 degrees with the gate lines 121 and are perpendicular to each other.

The lower and the upper sub-pixel electrodes 190a1 and 190a2 are connected to the lower and the upper expansions 177a1 and 177a2 of the drain electrodes 175 through contact holes 185a1 and 185a2, respectively.

The central sub-pixel electrode 190b is connected to a capacitive electrode 136 through a contact hole 186 and overlaps a coupling electrode 176. The central sub-pixel electrode 190b, the capacitive electrode 136, and the coupling electrode 176 form a "coupling capacitor."

The central sub-pixel electrode 190b has central cutouts 93 and 94, the lower sub-pixel electrode 190a1 has lower cutouts 96a and 97a, and the upper sub-pixel electrode 190a2 has upper cutouts 96b and 97b. The cutouts 93, 94, and 96a-97b partition the sub-pixel electrodes 190b, 190a1, and 190a2 into a plurality of partitions. The pixel electrode 190 having the cutouts 93, 94, and 96a-97b and the gaps 95a and 95b (also referred to as cutouts hereinafter) substantially has an inversion symmetry with respect to a capacitive electrode 136.

Each of the lower and the upper cutouts 96a-97b obliquely extends approximately from a left corner, a lower edge, or an upper edge of the pixel electrode 190 to approximately a right edge of the pixel electrode 190. The lower and the upper cutouts 96a-97b form an angle of about 45 degrees with respect to the gate lines 121, and extend substantially perpendicular to each other.

Each of the center cutouts 93 and 94 includes a transverse portion and a pair of oblique portions connected thereto. The transverse portion shortly extends along the capacitive electrode 136, and the oblique portions obliquely extend from the transverse portion toward the left edge of the pixel electrode 190 in parallel to the lower and the upper cutouts 96a-97b, respectively. The center cutout 93 overlaps the funneled end portion of the coupling electrode 176 and the capacitive electrode 136.

A shielding electrode 88 is also formed on the passivation layer 180. The shielding electrode 88 is supplied with the common voltage. The shielding electrode 88 includes longitudinal portions extending along the data lines 171 and transverse portions extending along the gate lines 127 to connect adjacent longitudinal portions. The longitudinal portions fully cover the data lines 171, while each of the transverse portions lies within the boundary of a gate line 121.

The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171.

Since there is no electric field between the shielding electrode 88 and the common electrode 270, the LC molecules 310 adjacent to the shielding electrode 88 remain in their initial orientations. Thus, the light incident thereon is blocked. Accordingly, the shielding electrode 88 may serve as a light blocking member and the light blocking member 220 may be omitted.

The light blocking member 220 includes a plurality of rectilinear portions facing the data lines 171 on the TFT array panel 100 and a plurality of widened portions facing the TFTs on the TFT array panel 100. Alternatively, the light blocking member 220 may have a plurality of openings that face the pixel electrodes 190 and may have substantially the same planar shape as the pixel electrodes 190.

The common electrode 270 has a plurality of sets of cutouts 73, 74, 75, 76a, 76b, 77a, 77b, 78a, and 78b.

The set of cutouts 73-78b face a pixel electrode 190 and include center cutouts 73, 74 and 75, lower cutouts 76a, 77a, and 78a, and upper cutouts 76b, 77b, and 78b. The cutout 73 is disposed near the contact hole 186. Each of the cutouts 74-78b is disposed between adjacent cutouts 93-97b of the pixel electrode 190 or between a cutout 97a or 97b and a chamfered edge of the pixel electrode 190. Each of the cutouts 73-78b has at least an oblique portion extending parallel to the lower cutout 95a-97a or the upper cutout 95b-97b of the pixel electrode 190. Each of the oblique portions of the cutouts 74-77b includes a depressed notch. The cutouts 73-78b have substantially an inversion symmetry with respect to a capacitive electrode 136.

Each of the lower and the upper cutouts 76a-78b includes an oblique portion and a pair of transverse and longitudinal portions or a pair of longitudinal portions. The oblique portion extends approximately from a left edge, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and forming obtuse angles with the oblique portion.

Each of the center cutouts 73 and 74 includes a central transverse portion, a pair of oblique portions, and a pair of terminal longitudinal portions. The center cutout 75 includes a pair of oblique portions and a pair of terminal longitudinal portions. The central transverse portion is disposed near the left edge or a center of the pixel electrode 190 and extends along the capacitive electrode 136. The oblique portions extend from an end of the central transverse portion or approximately from a center of the right edge of the pixel electrode 190, approximately to the left edge of the pixel electrode. The oblique portions of the cutouts 73 and 74 form oblique angles with the central transverse portion. The terminal longitudinal portions extend from the ends of the respective oblique portions along the left edge of the pixel electrode 190, overlapping the left edge of the pixel electrode 190, and forming obtuse angles with the respective oblique portions.

The opaque members (such as the storage electrode lines 131, the capacitive electrodes 136, and the expansions 177a1, 177a2 and 176 and the interconnections 178a1 and 178a2 of the drain electrodes 175) and the transparent members (such as the pixel electrodes 190 having the cutouts 93-97b and 73-78b) are symmetrically arranged with respect to the capacitive electrodes 136 that are equidistant from adjacent gate lines 121. At this time, since the interconnections 178a1 and 178a2 are disposed near the edges of the pixel electrodes 190, the interconnections 178a1 and 178a2 do not decrease the light transmissive areas, but rather block the texture generated near the light transmissive areas.

An LCD according to another embodiment of the present invention will be described in detail with reference to FIGS. 24 and 25.

Figure 24:
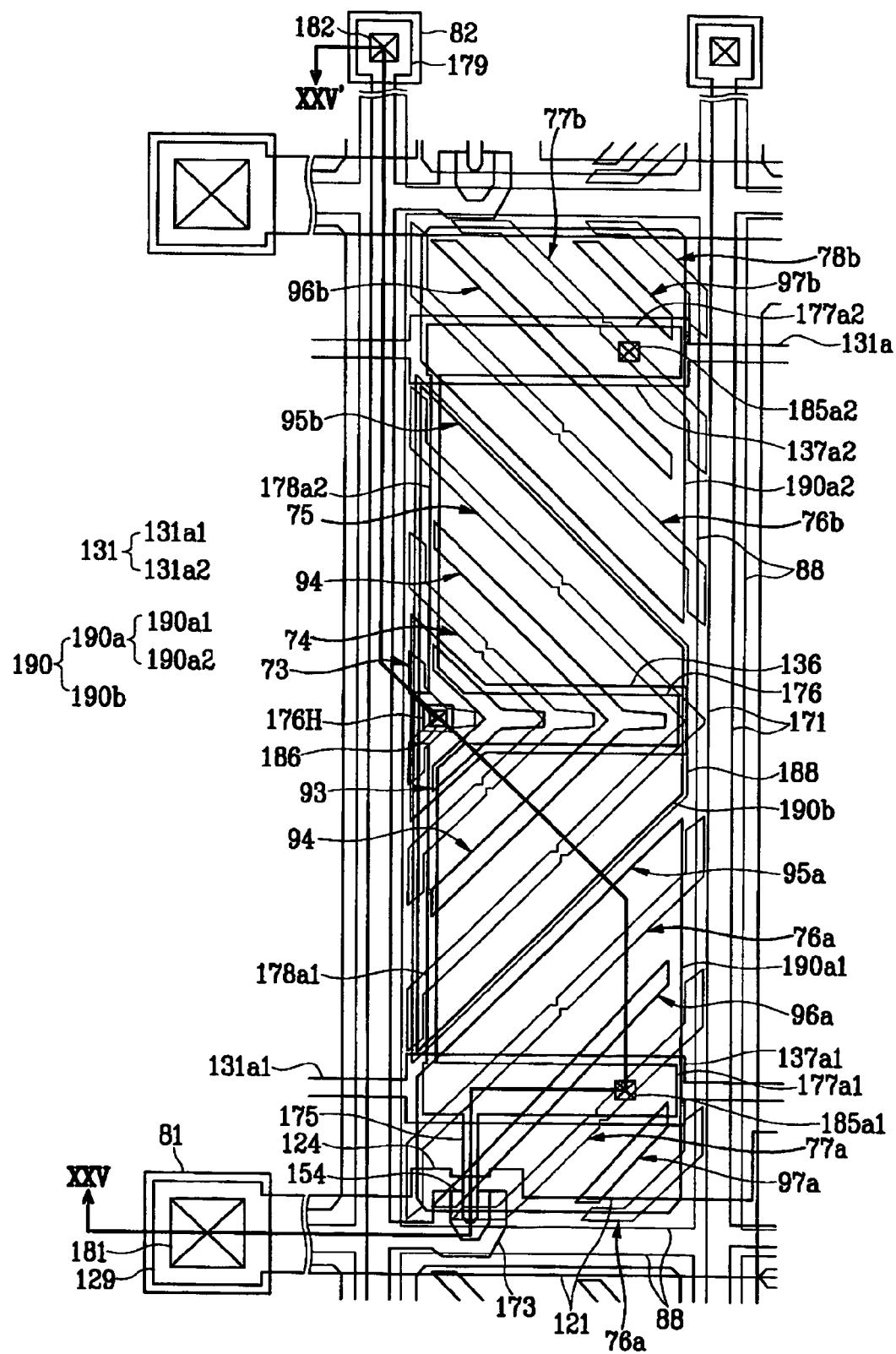
FIG. 24 is a layout view of an LCD according to another embodiment of the present invention.
Figure 25:
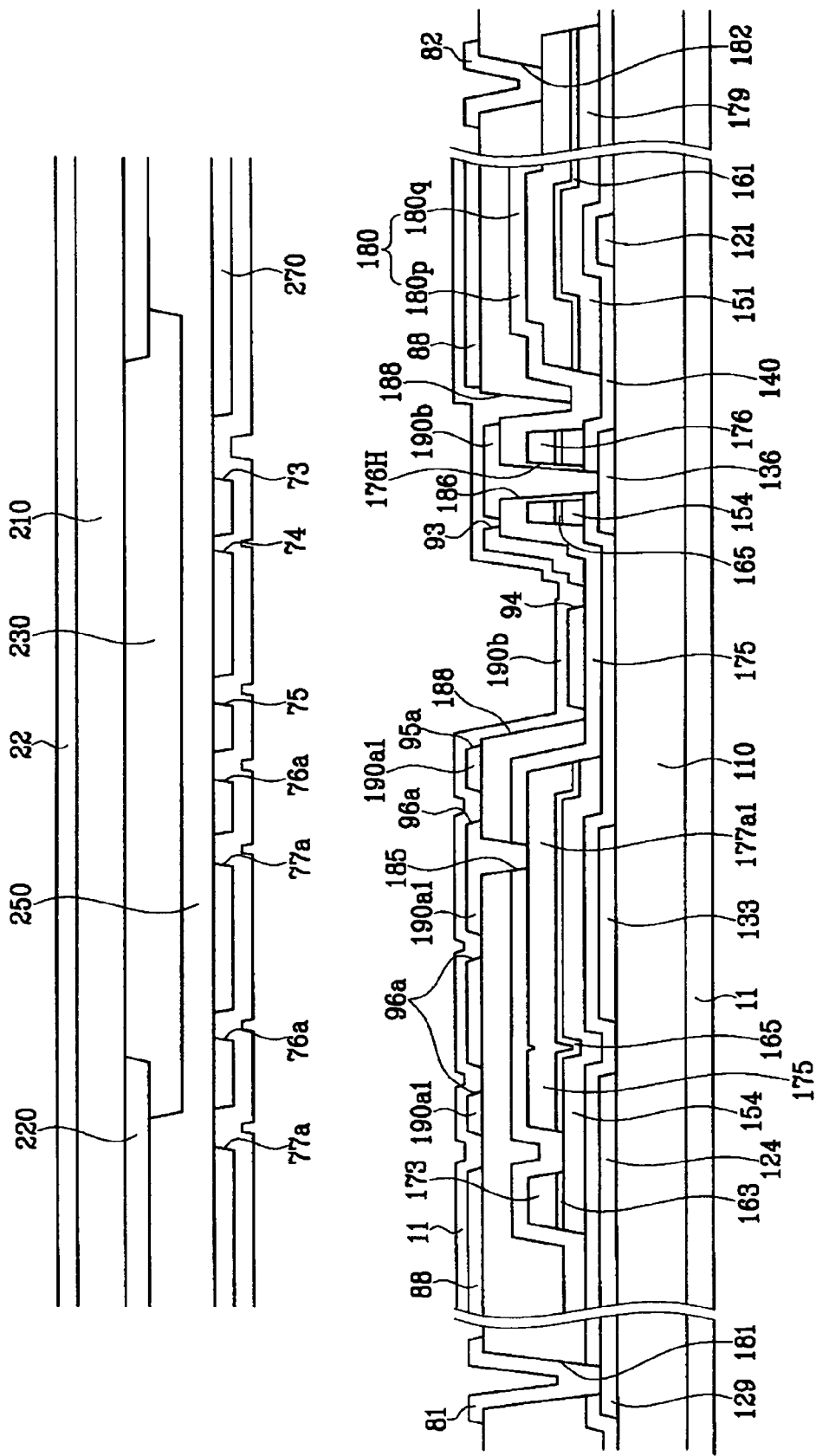
FIG. 25 is a sectional view of the LCD shown in FIG. 24 taken along line XXV-XXV'.

FIG. 24 is a layout view of an LCD according to another embodiment of the present invention, and FIG. 25 is a sectional view of the LCD shown in FIG. 24 taken along line XXV-XXV'.

Referring to FIGS. 24 and 25, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

The layered structures of the panels 100 and 200 according to this embodiment are similar to those shown in FIGS. 20-23, with differences described in greater detail below.

Regarding the TFT array panel 100, a plurality of gate lines 121, including gate electrodes 124 and end portions 129, a plurality of storage electrode lines 131, including stems 131a1 and 131a2 and storage electrodes 137a1 and 137a2, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171, including source electrodes 173 and end portions 179, and a plurality of drain electrodes 175, including expansions 177a1, 177a2, and 176 and interconnections 178a1 and 178a2, are formed on the ohmic contacts 163 and 165. A passivation layer 180 is formed on the data lines 171, the drain electrodes 175, and exposed portions of the semiconductors 154. A plurality of contact holes 181 are provided in the passivation layer 180 and the gate insulating layer 140. A plurality of contact holes 182, 185a1 and 185a2 are provided in the passivation layer 180. A plurality of openings 188 are provided in the upper passivation film 180q. A plurality of contact holes 186 are provided in the lower passivation film 180p. The contact holes 186 pass through through-holes 176H provided in the expansions 176 of the drain electrodes 175. A plurality of pixel electrodes 190 including subpixel electrodes 190a1, 190a2, and 190b and having cutouts 93-97b, a shielding electrode 88, and a plurality of contact assistants 81 and 82 are formed on the passivation layer 180, and an alignment layer 11 is coated thereon.

Regarding the common electrode panel 200, a light blocking member 220, a plurality of color filters 230, an overcoat 250, a common electrode 270 having cutouts 73-78b, and an alignment layer 21 are formed on an insulating substrate 210.

In contrast with the LCD shown in FIGS. 20-23, the semiconductors 154 and the ohmic contacts 163 of the TFT array panel 100 according to this embodiment extend along the data lines 171 to form semiconductor stripes 151 and ohmic contact stripes 161. In addition, the semiconductor stripes 154 have almost the same planar shapes as the data lines 171 and the drain electrodes 175 as well as the underlying ohmic contacts 163 and 165. However, the semiconductors 154 include some exposed portions, which are not covered with the data lines 171 and the drain electrodes 175, such as portions located between the source electrodes 173 and the drain electrodes 175.

A manufacturing method of the TFT array panel according to an embodiment simultaneously forms the data lines 171 and the drain electrodes 175, the semiconductors 151, and the ohmic contacts 161 and 165 using a single photolithography step to simplify the manufacturing process.

Many of the above-described features of the LCD shown in FIGS. 20-23 may be appropriate to the LCD shown in FIGS. 24 and 25.

The present invention can be employed in twisted nematic (TN) mode LCD or in-plane switching mode LCD.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
   a gate line;
   a data line intersecting the gate line;
   a thin film transistor coupled to the gate line and the data line; and
   a pixel including a first subpixel coupled to the thin film transistor and a second subpixel capacitively coupled to the first subpixel,
   wherein the first subpixel and the second subpixel have different cell gaps.

2. The liquid crystal display of claim 1, wherein the cell gap of the first subpixel is smaller than the cell gap of the second subpixel.

3. A liquid crystal display comprising:
   a gate line;
   a data line intersecting the gate line;
   a thin film transistor coupled to the gate line and the data line; and
   a pixel including a first subpixel coupled to the thin film transistor and a second subpixel capacitively coupled to the first subpixel,
   wherein the first subpixel and the second subpixel give different retardation.

4. The liquid crystal display of claim 3, wherein the retardation given by the first subpixel is smaller than the retardation given by the second subpixel.

5. A thin film transistor array panel comprising:
   a gate line;
   a data line intersecting the gate line;
   a thin film transistor coupled to the gate line and the data line; and
   a pixel electrode including a first subpixel electrode coupled to the thin film transistor and a second subpixel electrode spaced apart from the first subpixel electrode and having an electrical coupling with the first subpixel electrode,
   wherein the first subpixel electrode is disposed at a cross-sectional position higher than the second subpixel electrode.

6. The thin film transistor array panel of claim 5, further comprising an insulating layer disposed on the gate line, the data line, and the thin film transistor and including a first portion disposed under the first subpixel electrode and a second portion disposed under the second subpixel electrode and thinner than the first portion.

7. The thin film transistor array panel of claim 6, wherein the insulating layer comprises a lower film and an upper film, said upper film comprising a different material from the lower film and disposed on the lower film.

8. The thin film transistor array panel of claim 7, wherein the lower film comprises silicon nitride or silicon oxide, and the upper film comprises organic insulator.

9. The thin film transistor array panel of claim 7, wherein the first subpixel electrode is disposed on the upper film and the second subpixel electrode is disposed on the lower film.

10. The thin film transistor array panel of claim 9, wherein the upper film has an opening exposing the lower film and the second subpixel electrode is disposed in the opening.

11. The thin film transistor array panel of claim 5, wherein the second subpixel electrode is capacitively coupled to the first subpixel electrode.

12. The thin film transistor array panel of claim 5, further comprising a coupling electrode coupled to the first subpixel electrode and overlapping the second subpixel electrode.

13. The thin film transistor array panel of claim 12, wherein the coupling electrode is coupled to the thin film transistor.

14. The thin film transistor array panel of claim 13, further comprising a storage electrode overlapping the pixel electrode, the coupling electrode, and a terminal of the thin film transistor.

15. A liquid crystal display comprising:
   a gate line;
   a data line intersecting the gate line;
   a thin film transistor coupled to the gate line and the data line;
   a pixel electrode including a first subpixel electrode coupled to the thin film transistor and a second subpixel electrode spaced apart from the first subpixel electrode and capacitively coupled with the first subpixel electrode;
   a common electrode disposed opposite the pixel electrode; and
   a liquid crystal layer disposed between the pixel electrode and the common electrode and including a first region disposed on the first subpixel electrode and a second region disposed on the second subpixel electrode,
   wherein the thickness of the first and the second regions of the liquid crystal layer is different.

16. The liquid crystal display of claim 15, wherein the first region of the liquid crystal layer is thinner than the second region of the liquid crystal layer.

17. The liquid crystal display of claim 16, further comprising a passivation layer disposed on the gate lines, the data line, and the thin film transistor and including a first portion disposed under the first subpixel electrode and a second portion disposed under the second subpixel electrode and thicker than the first portion.

18. The liquid crystal display of claim 17, wherein the passivation layer includes a first thin film and a second thin film disposed on the first thin film and thinner than disposed on the gate lines, the data line, and the pixel electrode and including a first portion disposed under the first subpixel electrode and a second portion disposed under the second subpixel electrode and thicker than the first portion.

* * * * *